US008848773B2

(12) United States Patent
Khayrallah et al.

(10) Patent No.: US 8,848,773 B2
(45) Date of Patent: Sep. 30, 2014

(54) RATE CONTROL FOR A VIRTUAL DIVERSITY RECEIVER

(71) Applicant: Telefonaktiebolaget L M Ericsson (Publ), Stockholm (SE)

(72) Inventors: Ali S. Khayrallah, Mountain View, CA (US); Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 37 days.

(21) Appl. No.: 13/633,733

(22) Filed: Oct. 2, 2012

(65) Prior Publication Data

US 2014/0092950 A1    Apr. 3, 2014

(51) Int. Cl.
| H04B 17/00 | (2006.01) |
| H04L 25/02 | (2006.01) |
| H04L 1/00 | (2006.01) |
| H04B 7/06 | (2006.01) |

(52) U.S. Cl.
CPC ............ *H04B 17/00* (2013.01); *H04L 25/0224* (2013.01); *H04L 1/0009* (2013.01); *H04L 1/0002* (2013.01); *H04B 7/0697* (2013.01); *H04L 25/0204* (2013.01)
USPC ........... 375/227; 375/267; 375/299; 375/347; 455/101; 455/132; 455/296; 455/500; 455/562.1; 370/334; 370/464

(58) Field of Classification Search
USPC .......... 375/227, 267, 299, 347; 455/101, 132, 455/296, 500, 562.1; 370/334, 464
See application file for complete search history.

(56) References Cited

U.S. PATENT DOCUMENTS 7,986,750 B2    7/2011  Hwang et al.
8,351,555 B2 *  1/2013  Semenov et al. ............. 375/350
2010/0111044 A1  5/2010  Kawamura et al.
2012/0243503 A1  9/2012  Mochida

OTHER PUBLICATIONS

Larson, Peter and Nikias Johansson, "Multi-User ARQ," IEEE VTC Spring, 2006, 2052-2057.
Maddah-Ali, Mohammad Ali et al., "Completely Stale Transmitter Channel State Information is Still Very Useful," Allerton Conference 2010, Sep. 26, 2011, arXiv:1010.1499v2, 26 pages.
Office Action issued in U.S. Appl. No. 13/633,731, dated Jan. 30, 2014, 19 pages.
Office Action issued in U.S. Appl. No. 13/633,731, dated May 30, 2014, 33 pages.
Amendment and Reply Under 37 C.F.R. § 1.111 in U.S. Appl. No. 13/633,731, dated Aug. 21, 2014, 28 pages.

* cited by examiner

*Primary Examiner* — Leon Flores
(74) *Attorney, Agent, or Firm* — Rothwell, Figg, Ernst & Manbeck, P.C.

(57) ABSTRACT

Devices and methods for determining transmission rates based on a virtual diversity receiver (VDR) scheme are disclosed. Performance is improved through determination of appropriate transmission rates, which are determined based on one or more signal to interference plus noise ratios (SINRs). The SINRs are calculated using virtual noise and channel coefficient values obtained as part of the VDR scheme. Utilizing an underlying pilot structure a user device may receive several sets of symbols. These symbols are then used to obtain both real and virtual channel noise power values and channel coefficients. These values and coefficients are then used to determine first and second SINR values indicative of one or more channels in the communication network. These SINR values may correlate to transmission rates (modulation order and/or coding rate). The SINRs may be sent to a base station, or the user device itself may determine one or more transmission rates.

44 Claims, 11 Drawing Sheets

|  | Radio resource element 1 | Radio resource element 2 | Radio resource element 3 | Radio resource element 4 |
|---|---|---|---|---|
| $p_1[1]$ | 1 | 1 | 1 | 1 |
| $p_2[1]$ | 1 | 1 | −1 | −1 |
| $p_1[2]$ | 1 | −1 | 1 | −1 |
| $p_2[2]$ | 1 | −1 | −1 | 1 |

FIG. 6

| receive SINR range (dB) | modulation order | coding rate |
|---|---|---|
| less than −11.5 | 2 (i.e. QPSK) | 0.0313 |
| [−11.5,−10.5) | 2 | 0.0379 |
| [−10.5,−9.5) | 2 | 0.0495 |
| [−9.5,−8.5) | 2 | 0.0627 |
| [−8.5,−7.5) | 2 | 0.0758 |
| [−7.5,−6.5) | 2 | 0.0990 |
| [−6.5,−5.5) | 2 | 0.1253 |
| [−5.5,−4.5) | 2 | 0.1516 |
| [−4.5,−3.5) | 2 | 0.1979 |
| [−3.5,−2.5) | 2 | 0.2505 |
| [−2.5,−1.5) | 2 | 0.3031 |
| [−1.5,−0.5) | 2 | 0.3558 |
| [−0.5, 0.5) | 2 | 0.4407 |
| [0.5, 1.5) | 2 | 0.5213 |
| [1.5, 2.5) | 2 | 0.6021 |
| [2.5, 3.5) | 4 (i.e. 16-QAM) | 0.3414 |
| [3.5, 4.5) | 4 | 0.3817 |
| [4.5, 5.5) | 4 | 0.4220 |
| [5.5, 6.5) | 4 | 0.4624 |
| [6.5, 7.5) | 4 | 0.5027 |
| [7.5, 8.5) | 4 | 0.6284 |
| [8.5, 9.5) | 4 | 0.6915 |
| [9.5, 10.5) | 4 | 0.7546 |
| [10.5, 11.5) | 4 | 0.8176 |
| [11.5, 12.5) | 4 | 0.8807 |
| [12.5, 13.5) | 4 | 0.9438 |
| >=13.5 | 4 | 1.0000 |

FIG. 8

RATE CONTROL FOR A VIRTUAL DIVERSITY RECEIVER

TECHNICAL FIELD

The present invention relates generally to improving data transmission on telecommunication networks, and more particularly, to a method and device for determining transmission rates based on a virtual diversity receiver scheme in a telecommunication network.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. As illustrated in FIG. 1, LTE transmissions are sent from base stations 102, such as Node Bs (NBs) and evolved Node Bs (eNBs) in a telecommunication network 106, to mobile stations 104 (e.g., user equipment (UE)). Examples of wireless UE communication devices include mobile telephones, personal digital assistants, electronic readers, portable electronic tablets, personal computers, and laptop computers.

The LTE standard is primarily based on Orthogonal Frequency Division Multiplexing (OFDM) in the downlink, which splits the signal into multiple parallel sub-carriers in frequency, and Single Carrier Frequency Domain Multiple Access (SC-FDMA) in the uplink. A transmit time interval (TTI) is the basic logical unit. A radio resource element (RE) is the smallest addressable location within a TTI, corresponding to a certain time location and a certain frequency location. For instance, as illustrated in FIG. 2, a sub-frame 200 comprised of REs may be transmitted in a TTI in accordance with the LTE standard, and may consists of sub-carriers 204 in the frequency domain. In the time domain, the sub-frame may be divided into a number of OFDM (or SC-FDMA) symbols 208. An OFDM (or SC-FDMA) symbol 208 may include a cyclic prefix 206. Thus, the unit of one sub-carrier and one symbol is a resource unit or element 202.

Wireless communication systems may be deployed in a number of configurations, such as Multiple-Input, Multiple-Output (MIMO) radio systems. An exemplary MIMO system including a base station 302, such as an eNB, and user equipment 304 is shown in FIG. 3. When a signal is transmitted by the eNB 302 in a downlink, i.e., the link carrying transmissions from the eNB to the UE 304, a sub-frame may be transmitted from multiple antennas 306,308 and the signal may be received at a UE 304, which has one or more antennas. The radio channel distorts the transmitted signals from the multiple antenna ports. UE 304 may use receiver-diversity signal processing schemes to improve performance.

In an LTE system, transmissions intended for a first user are often overheard by a second, unintended user. The second user may utilize overheard data packets in various ways. For instance, "*Completely Stale Transmitter Channel State Information is Still Very Useful*," by M. Maddah-Ali and D. Tse, Allerton Conference, 2010, describes a multi-user downlink MIMO scheme with a mechanism for information exchange between single antenna terminals, where the terminals feed back channel state information (CSI) to the serving base station. The serving base station exploits this CSI to broadcast an additional signal, which each terminal uses to create a virtual diversity receiver (VDR). This type of information exchange may be referred to as "stale feedback," since the channel may have changed significantly by the time the base station transmits the extra signal. In this scheme, a mobile device that receives signals on only a single antenna may still take advantage of simple receive-diversity processing techniques. Similarly, "*Multi-User ARQ*," by Peter Larsson and Nicklas Johansson, IEEE VTC Spring, 2006, which is incorporated by reference herein in its entirety, discusses an Automated Repeat request (ARQ) control scheme that exploits the fact that users frequently overhear each other's information.

Other techniques utilize an explicit pilot structure that can be effectively used to facilitate the estimation of channel parameters at the receivers, including true channel taps, as well as estimations of the virtual channels created by the VDR scheme. However, the presently know schemes do not address the number of information bits per TTI or transmission rate that may be supported in a given scheme.

The implemented transmission rate for a given scheme is dependent on what information is available regarding the quality of transmissions received at a user device. Two exemplary types or rate control mechanisms are a "fast rate control" mechanism, based on instantaneous channel conditions, and a "slow rate control" mechanism, based on average channel conditions. The two mechanisms may be best suited for different scenarios. For instance, at low Doppler speeds, channel prediction is accurate, such that fast rate control would be preferable. However, at higher Doppler speeds, it may be preferable to implement slow rate control in order to avoid prediction errors and ensure that the selected rate matches the average channel state. A communication system may also include additional mechanisms to improve robustness, such as an outer-loop control mechanism to adjust certain estimates if previous iterations result in a rate that is too high or too low. For instance, outer-loop control may be based on monitoring the number of HARQ transmissions actually required compared to a target value.

In a fast rate control scenario, a user device (or the base station) may use the most recent channel estimate, $H_{ij}[t]$, between a transmit antenna j and receive antenna i with a noise estimate, $z_i[t]$, to derive a desired transmission rate for information transmitted between antennas i and j. For instance, let $$H_j[t] = [H_{1j}[t], H_{2j}[t]]^T \qquad (i)$$

be the channel coefficient vector associated with transmit antenna j at time t, with each of the elements corresponding to one receive antenna. In equation (i), the superscript "T" represents the transpose of a vector or matrix.

Using a linear minimum mean-square error (MMSE) receiver, the transmission rate of the data stream from a first transmit antenna could be determined based on the signal to noise plus interference ratio (SINR)

$$SINR_1 = P_1 H_1^H[t](P_2 H_2[t] H_2^H[t] + R_z)^{-1} H_1[t] \qquad (ii)$$

where the superscript "H" represents the conjugate transpose, $P_j$ is the transmit power from antenna j, or the power adjustment factor for transmit antenna j, and $R_z$ is the covariance of noise, $$z[t] = [z_1[t], z_2[t]]^T \qquad (iii),$$

which can be estimated using reference symbols.

Similarly, the SINR of a data stream from a second transmit antenna can be determined by $$SINR_2 = P_2 H_2^H[t](P_1 H_1[t] H_1^H[t] + R_z)^{-1} H_2[t] \qquad (iv).$$

If a successive interference cancellation (SIC) receiver is used, the data stream from one transmit antenna is detected and cancelled before detecting the other data stream. The order of detection may be fixed, or may be based on some additional criterion. Without loss of generality, we describe the case where the data stream from the first antenna is detected and canceled first. Then $SINR_1$ is unchanged, and $SINR_2$ may be estimated instead using:

$$SINR_2 = P_2 H_2^H[t] R_z^{-1} H_2[t] \quad (v)$$

The case where the stream from the second antenna is detected and cancelled first is handled similarly. Regardless of receiver type, $SINR_1$ and $SINR_2$ may be translated into transmission rates using a look-up table, for example, as shown in FIG. 8. In this particular example, transmission rate is determined based on the combination of modulation and coding rate, together.

In a situation where instantaneous or recently updated channel coefficients are not available or reliable, slow rate control may be used because it is based on longer-term statistics. For instance, a receiver may estimate the power of one or more channel taps, using a time average, determined by $$P_{H_{ij}[t]} = \frac{1}{K} \sum_{k=0}^{K-1} |H_{ij}[t-D-k]|^2 \quad (vi)$$

where D is delay, and K is a number of values. Similarly, a noise power estimate may be determined by $$P_{z_i[t]} = \frac{1}{K} \sum_{k=0}^{K-1} |z_i[t-D-k]|^2 \quad (vii)$$

for the same or different values of D and K. Alternative averaging methods may be suitable as well. Assuming that the power estimates are available to a MMSE receiver, the SINR of a data stream from the first transmit antenna would be determined by $$SINR_1 = \frac{P_1 P_{H_{11}[t]}}{P_2 P_{H_{12}[t]} + P_{z_1[t]}} + \frac{P_1 P_{H_{21}[t]}}{P_2 P_{H_{22}[t]} + P_{z_2[t]}} \quad (viii)$$

and the SINR of a data stream from the second transmit antenna would be determined by $$SINR_2 = \frac{P_2 P_{H_{12}[t]}}{P_1 P_{H_{11}[t]} + P_{z_1[t]}} + \frac{P_2 P_{H_{22}[t]}}{P_1 P_{H_{21}[t]} + P_{z_2[t]}}. \quad (ix)$$

If the receiver were a SIC receiver, and the first stream is detected and cancelled first, then $SINR_1$ would be unchanged, and $SINR_2$ would become:

$$SINR_2 = \frac{P_2 P_{H_{12}[t]}}{P_{z_1[t]}} + \frac{P_2 P_{H_{22}[t]}}{P_{z_2[t]}}. \quad (x)$$

The case where the second stream is detected and cancelled first is handled similarly. Again, each SINR could be converted to a transmission rate through the use of a look-up table.

Despite the foregoing, there remains a need for methods and systems for determining transmission rates based on virtual data in order to fully realize the improved transmission properties available in a virtual diversity scheme. A stale feedback scenario, for instance as described in *Completely Stale Transmitter Channel State Information is Still Very Useful*, by M. Maddah-Ali and D. Tse, cannot be effectively utilized without a rate control mechanism.

SUMMARY

Particular embodiments of the present invention are directed to devices and methods for improving performance in a communication network that includes a plurality of transmit antennas and a plurality of user devices.

Performance is improved through the determination of appropriate transmission rates, which may be determined based on one or more signal to interference plus noise ratios (SINRs). The SINRs are calculated using virtual noise and channel coefficient values obtained as part of a virtual diversity receiver (VDR) scheme. For instance, utilizing a suitable pilot structure, such as the structure described herein or application Ser. No. 13/633,731, titled "Pilot Structure to Support a Virtual Diversity Receiver Scheme," which is incorporated herein by reference in its entirety, a user device may receive several sets of symbols. These symbols are then used to obtain both real and virtual channel noise power values and channel coefficients. These values and coefficients are then used to determine first and second SINR values indicative of one or more channels in the communication network. According to certain aspects of the present invention, these SINR values correlate to transmission rates (modulation order and/or coding rate). The SINRs may be sent to a base station for use in determining transmission rates or the user device itself may determine one or more transmission rates and send the determined rate to one or more base stations. Accordingly, the additional information provided through the implementation of a VDR scheme is fully utilized to improve performance.

In one particular aspect, a method for improving performance in a communication network with a plurality of transmit antennas and user devices is provided. The method includes receiving, at a first user device, a first set of received symbols, a second set of received symbols, and a third set of received symbols. The method also includes obtaining a channel noise power value and a set of channel coefficients. The channel noise power value and the channel coefficients are based on the first set of received symbols. The method also includes obtaining a virtual channel noise power value and a set of virtual channel coefficients. The virtual channel noise power value and the virtual channel coefficients are based on the second and third sets of received symbols. The channel noise power value, the set of channel coefficients, the virtual channel noise power value, and the set of virtual channel coefficients are each associated with one of the plurality of antennas.

First and second signal to interference plus noise ratios are then determined based on the obtained values and coefficients. The first signal to interference plus noise ratio is determined based on the channel noise power value, the set of channel coefficients, the virtual channel noise power value, and the set of virtual channel coefficients. The second signal to interference plus noise ratio is determined based on at least one of the channel noise power value, the set of channel coefficients, the virtual channel noise power value, and the set of virtual channel coefficients.

In certain aspects, the method further includes reporting the first and second signal to interference plus noise ratios to one or more base stations. The base station may use the reported signal to interference plus noise ratios to determine one or more transmission rates. The method may also include determining a transmission rate based on the first and second interference plus noise ratios at the user device, and sending the determined transmission rate to one or more base stations.

In another aspect, certain embodiments of the present invention are directed to a mobile device operable in a communication network to receive signals from a plurality of transmit antennas. The mobile device includes a processor, a memory coupled to the processor, a transceiver coupled to the processor, and one or more antennas coupled to the transceiver, which are configured to transmit and receive signals. The processor is configured to receive a first set of received symbols, a second set of received symbols, and a third set of received symbols. The processor is further configured to obtain a channel noise power value and a set of channel coefficients based on the first set of received symbols, as well as a virtual channel noise power value and a set of virtual channel coefficients based on the second and third sets of received symbols. The processor uses the channel noise power value, the set of channel coefficients, the virtual channel noise power value, and the set of virtual channel coefficients to determine a first signal to interference plus noise ratio. The processor also determines a second signal to interference plus noise ratio based on at least one of the channel noise power value, the set of channel coefficients, the virtual channel noise power value, and the set of virtual channel coefficients. The channel noise power value, the set of channel coefficients, the virtual channel noise power value, and the set of virtual channel coefficients are each associated with one of the plurality of transmit antennas.

According to certain embodiments, the processor is further configured to report the first and second signal to interference plus noise ratios to one or more base stations. The processor may also be configured to determine a transmission rate based on one or more of the first and second signal to interference plus noise ratios and transmit the transmission rate to one or more base stations.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 6 is an illustration of pilot sequences in accordance with exemplary embodiments of the present invention.

FIG. 8 is a table relating SINR to modulation order and coding rate.

DETAILED DESCRIPTION

Particular embodiments of the present invention are directed to devices and methods for determining transmission rates for a virtual diversity receiver (VDR) based on one or more signal to interference plus noise ratios (SINRs).

Figure 1:
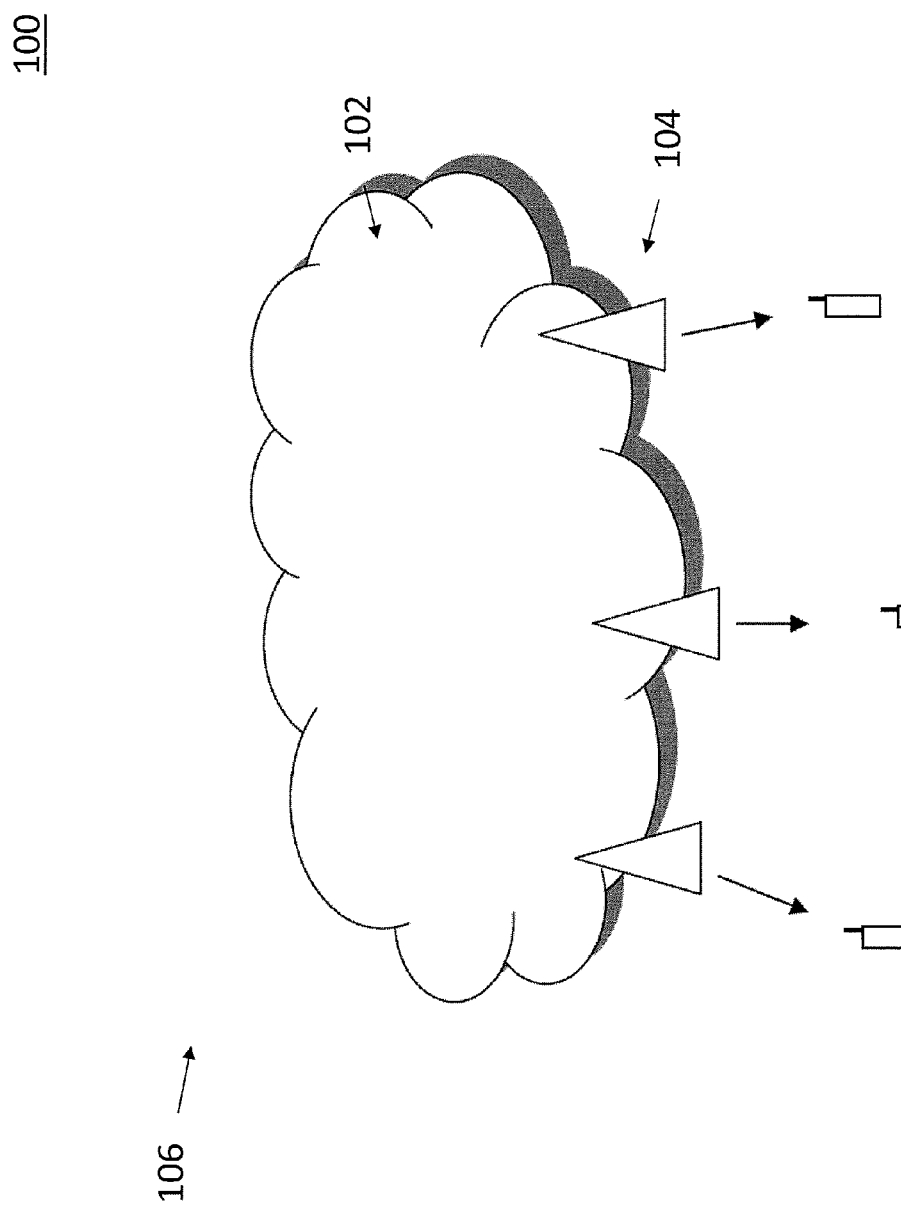
FIG. 1 is an illustration of a wireless communication system.
Figure 2:
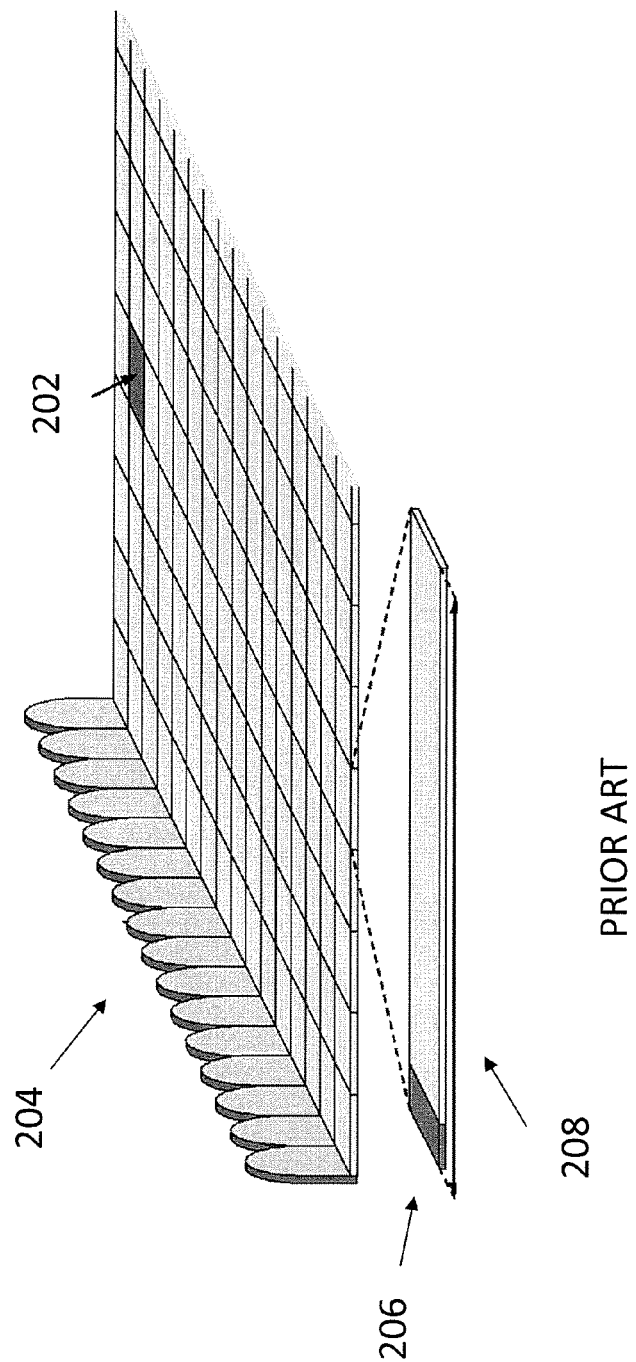
FIG. 2 is an exemplary sub-frame of an LTE transmission.
Figure 3:
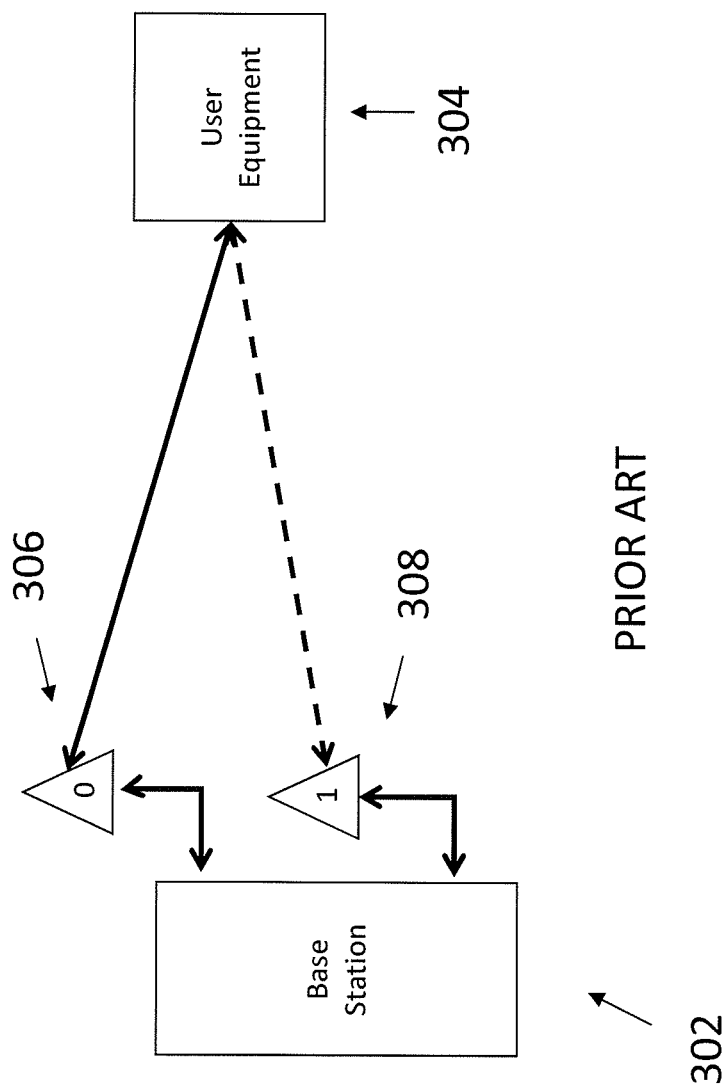
FIG. 3 is a block diagram of an exemplary MIMO system.
Figure 4:
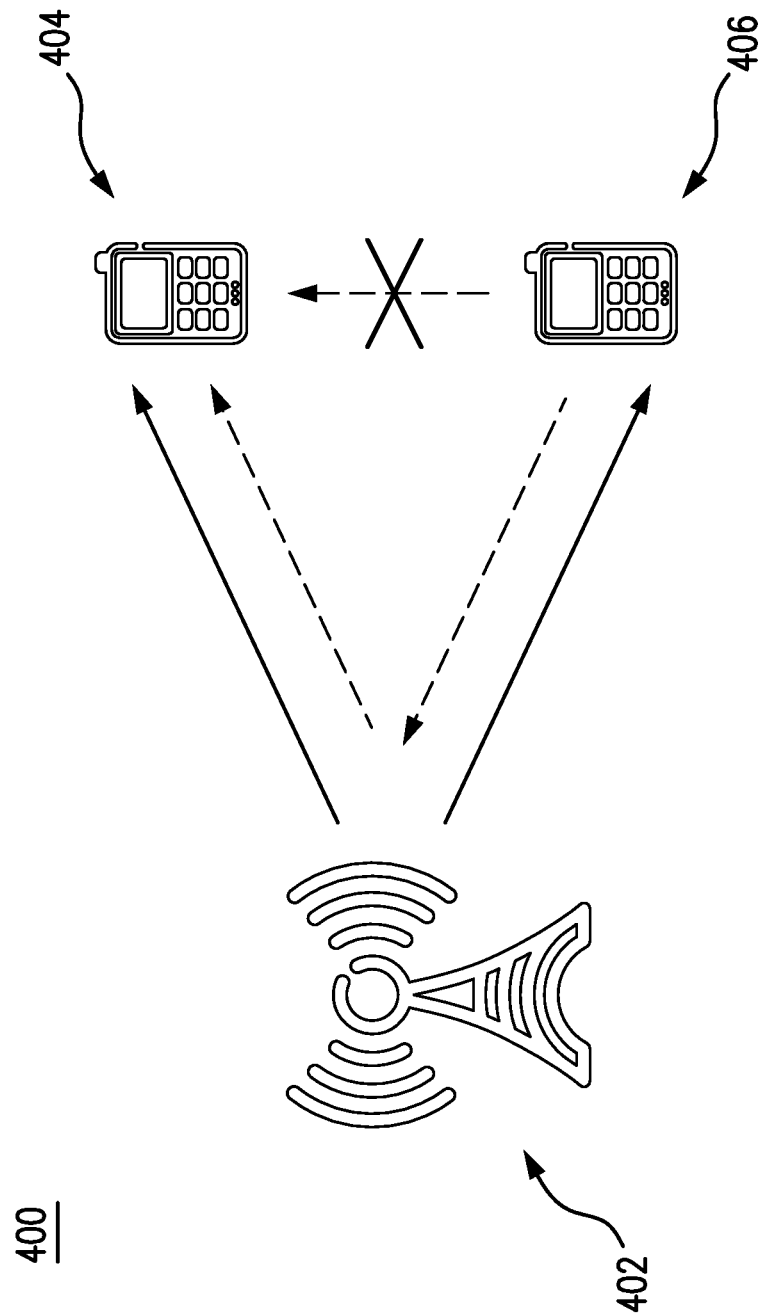
FIG. 4 is an illustration of a wireless communication system in accordance with exemplary embodiments of the present invention.

In order to improve the performance of a communication network, a VDR scheme may be implemented to exchange information between user devices via an intermediary device, such as a base station, as shown for example in FIG. 4. A pilot structure supports estimation of channel parameters at the receivers, including true channel taps, as well as estimations of the virtual channels created by the VDR scheme. Accordingly, each terminal performs as if it has more receive antennas than it actually does, which enables the use of receive-diversity signal processing techniques.

Figure 5:
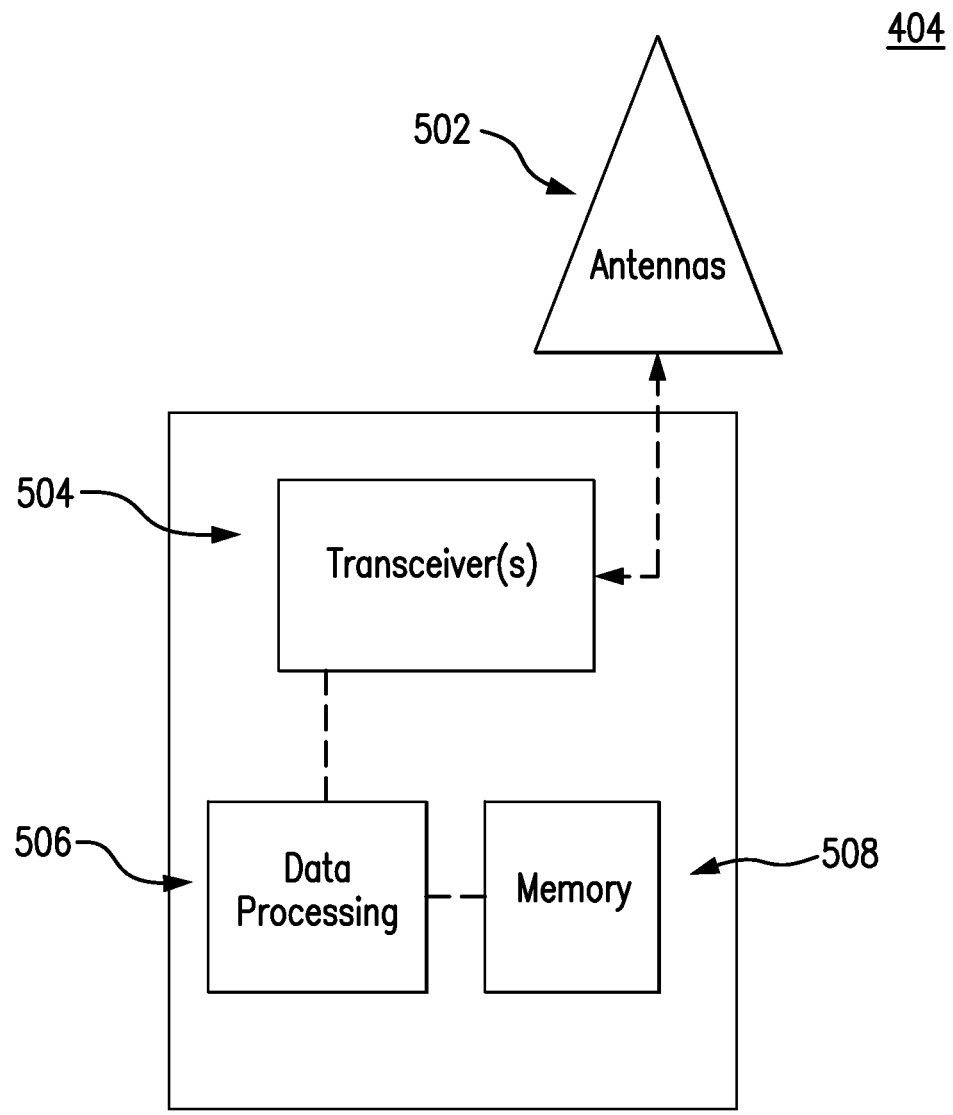
FIG. 5 is a block diagram of a user device in accordance with exemplary embodiments of the present invention.

FIG. 5 illustrates a block diagram of an exemplary UE communication device 404. As shown in FIG. 5, the UE communication device may include: a plurality of transmit antennas 502, a data processing system 506, which may include one or more microprocessors and/or one or more circuits, such as an application specific integrated circuit (ASIC), field-programmable gate arrays (FPGAs), or the like, and a data storage or memory system 508, which may include one or more non-volatile storage devices and/or one or more volatile storage devices (e.g., random access memory (RAM)). The one or more antennas 502 are connected to transceiver 504, which is configured to transmit and receive signals via the antennas 502.

In embodiments where data processing system 506 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 506 to perform steps described below (e.g., steps described below with reference to the flow charts shown in FIG. 7). In other embodiments, the UE communication device 404 is configured to perform steps described above without the need for code. That is, for example, data processing system 506 may consist of one or more ASICs. Hence, the features of the present invention described above may be implemented in hardware and/or software. For example, in particular embodiments, the functional components of the UE communication device 504 described above may be implemented by data processing system 506 executing computer instructions, by data processing system 506 operating independent of any computer instructions, or by any suitable combination of hardware and/or software.

According to certain embodiments, the methods and systems of the present invention may be implemented in a communication network that includes a base station with multiple transmit antennas, while a number of user devices in communication with the base station have only a single receive antenna. One of ordinary skill in the art will recognize that this scenario may be extended to the case of K transmit antennas and K user devices, for K>2. Similarly, the processes disclosed herein may also apply to user devices that have more than one receive antenna.

For example, as illustrated in FIG. 4, a base station 402 having at least two transmit antennas transmits information to two user devices, 404,406. The user devices 404,406 have a single receive antenna and can communicate with the base station 402 via one or more communication channels. However, they cannot communicate with each other.

The base station 402 transmits a first plurality of information symbols, u[t], intended for a first of the user devices 404. For instance, at a first time, t=1, base station 402 transmits two sets of information symbols, $u_1[1]$ and $u_2[1]$, which are intended for the first terminal, user device 404. (Here and in the description below, boldfaced variables indicate vectors representing a set of symbols.) The first set of information symbols, $u_1[1]$, may be transmitted from a first transmit antenna of the base station 402, while the second set of information symbols, $u_2[1]$, may be transmitted from a second transmit antenna of the base station 402. These signals are not only received by the intended user device, 404, but also by a second terminal, user device 406. Each set of information symbols, $u_j[t]$, include a set of data symbols and a set of pilot symbols. A set of pilot symbols forms a pilot sequence. Thus, the sequence formed by the pilot symbols within the first set of information symbols is referred to as the first pilot sequence and the sequence formed by the pilot symbols within the second set of information symbols is referred to as the second pilot sequence. The first and second sequences within the first plurality of information symbols are together referred to as the first plurality of pilot sequences.

Similarly, at t=2, the base station 402 transmits a second plurality of information symbols including two sets of information symbols, $u_1[2]$ and $u_2[2]$, which are intended for the second terminal, user device 406. This transmission will be overheard by the unintended recipient, user device 404. Each set of information symbols include a set of data symbols and a set of pilot symbols. Thus, the sequence formed by the pilot symbols within the first set of information symbols is referred to as the first pilot sequence and the sequence formed by the pilot symbols within the second set of information symbols is referred to as the second pilot sequence. The first and second sequences within the second plurality of information symbols are together referred to as the second plurality of pilot sequences.

The resulting system is given by $$r_i[t]=H_{i1}[t]u_1[t]+H_{i2}[t]u_2[t]+z_i[t] \quad (1)$$

for i=1, 2, where $u_j[t]$ denotes the set of information symbols transmitted from antenna j, $H_{ij}[t]$ denotes the channel from transmit antenna j to terminal i, $r_i[t]$ denotes the set of received symbols at terminal i, and $z_i[t]$ denotes the noise at terminal i.

The term symbol may be understood in the present context as representative of either a single symbol in a particular RE or as a block of multiple symbols, such as in the time, frequency, or code domains, or any combination thereof. In order to facilitate channel estimation, a pilot symbol structure is incorporated into the information symbols of the transmitted signal. The pilot symbols should be known to the receiving user devices. This pilot structure complements a stale feedback scheme and enables the estimation of both true and virtual channel taps. Exemplary pilot sequences are shown in FIG. 6.

According to certain embodiments of the present invention, the set of information symbols $u_1[t]$ is comprised of N individual symbols, occupying N resource units. Those resource units may be distributed in time, frequency or code space, and may be contiguous or spread out. Independent of how the symbols are placed physically, without any loss of generality, one may consider $u_1[t]$ as a 1-dimensional sequence of length N, with elements $u_{j,k}[t]$, k=1 . . . N.

According to certain embodiments of the present invention, the set of information symbols $u_1[t]$ is comprised of $N_d$ data symbols, denoted by $d_1[t]$, and $N_p=N-N_d$ pilot symbols, denoted by $p_1[t]$. A set of pilot symbols $p_1[t]$ may occupy a first portion of $u_1[t]$, e.g., the first $N_p$ resource units of $u_1[t]$. A set of data symbols $d_1[t]$ may occupy the last $N_d$ resource units of $u_1[t]$. This configuration may be defined by the following:

$$p_{j,k}[t]=u_{j,k}[t], k=1 \ldots N_p \quad (2)$$

and $$d_{j,k}[t]=u_{j,k+N_p}[t], k=1 \ldots N_d \quad (3)$$

Pilot symbols may be strategically placed within a given transmission in order to facilitate certain aspects of channel estimation. For instance, In an OFDM system, pilot symbols may be spread out in time and frequency, to capture frequency variations. Alternatively, in a GSM system, they may be lumped together in the middle of a time slot to capture time dispersion.

In certain aspects, the pilot symbols of two pilot sequences $p_1[t]$, and $p_2[t]$, are placed in the same air interface resource units. Accordingly, they will overlap completely at the receiver. In addition, the two pilot sequences may be chosen to be orthogonal to each other, i.e., that the inner product between the pilot sequences is zero:

$$\sum_{k=1}^{N_p} p_{1,k}[t]p_{2,k}^*[t] = 0 \quad (4)$$

This orthogonality property may improve channel estimation at the receivers, user devices 404 and 406.

A received signal $r_i[t]$ at terminal i may be given by equation (1), with elements $r_{i,k}[t]$, k=1 . . . N. According to an embodiment, the first $N_p$ symbols correspond to pilot symbol locations. A terminal, for instance user devices 404 and 406, can compute the estimate $$\hat{H}_{ij}[t] = \sum_{k=1}^{N_p} r_{i,k}[t]p_{j,k}^*[t] \quad (5)$$

which may be scaled by $\sum_{k=1}^{N_p} p_{j,k}[t]p_{j,k}^*[t]$. Other channel estimation schemes may be used alternatively. For example, the characteristics of the impairment component in the received symbols may be accounted for in the channel estimation process as in the case of minimum mean-square error (MMSE), maximum-likelihood (ML), or maximum-a-posteriori (MAP) channel estimation. Although $\hat{H}_{ij}[t]$ may be distorted by noise, it is not distorted by the other channel's signal, in the case of pilot orthogonality. Also, $N_p$ can be chosen large enough to ensure that $\hat{H}_{ij}[t]$ is close to the desired $H_{ij}[t]$. Such a selection reduces the number of data symbols $N_d$ that may be transmitted.

According to an embodiment, each of the terminals, user devices 404 and 406, communicate channel information to the base station 402 after receiving the information symbols discussed above. For example, user device 404 has received $r_1[1]$, while user device 406 has received $r_2[2]$, each containing the respective intended information symbols. Similarly, user device 404 has received $r_1[2]$, while user device 406 has received $r_2[1]$, each containing the respective unintended information symbols.

The base station 402 then receives feedback information from the user devices 404,406. For instance, the base station 402 receives first and second channel estimates for a first transmission from the second user device 406, and the base station 402 also receives first and second channel estimates for a second transmission from the first user device 404. According to certain embodiments of the present invention, each terminal, i, feeds back the channel values $H_{ij}[t]$ for $t \neq i$. These values are received by the base station 402 before a third time, $t=3$.

Using the channel estimates, the base station 402 can synthesize received values $\hat{r}_1[2]$ and $\hat{r}_2[1]$ according to $$\hat{r}_i[t] = H_{i1}[t]u_1[t] + H_{i2}[t]u_2[t] \quad (6)$$

These values may be transmitted to the user devices 404 and 406 so that each can recover the parts it needs in order to form a virtual antenna.

The base station 402 then determines one or more composite values based on the channel estimates. For instance, the base station 402 may combine the synthesized values according to $$u_1[3] = \hat{r}_1[2] + \hat{r}_2[1] \quad (7)$$

The composite value, which includes one or more composite pilot sequences, is then transmitted from base station 402. It may be transmitted, for example, at $t=3$ from the first antenna. According to certain embodiments of the invention, the second antenna may be silent during transmission of the combined symbol.

The set of composite symbols $u_1[3]$, described by equation (7) may be expanded to yield $$u_1[3] = \hat{r}_1[2] + \hat{r}_2[1] \quad (8)$$
$$= H_{11}[2]u_1[2] + H_{12}[2]u_2[2] + H_{21}[1]u_1[1] + H_{22}[1]u_2[1]$$

where $H_{ij}[t]$ is used in place of $\hat{H}_{ij}[t]$ to maintain consistency. According to certain embodiments of the present invention, the pilot and data symbols within each set of the information symbols $u_j[t]$, are the same as in the original transmissions at $t=1$ and 2. In one embodiment, the first $N_p$ resource units of the set of composite symbols are occupied by pilot symbols and form the pilot sequence $p_1[3]$, where the kth symbol in the pilot sequence $$p_{1,k}[3] = H_{11}[2]p_{1,k}[2] + H_{12}[2]p_{2,k}[2] + H_{21}[1]p_{1,k}[1] + H_{22}[1]p_{2,k}[1] \quad (9)$$

for $k=1 \ldots N_p$. In this scheme, the pilot sequence itself is a linear combination of pilot sequences.

According to certain embodiments of the present invention, the first user device 404 receives the set of composite symbols at time $t=3$. The received signal, $r_1[3]$, may be defined as $$r_1[3] = H_{11}[3]u_1[3] + z_1[3] = H_{11}[3](\hat{r}_1[2] + \hat{r}_2[1]) + z_1[3] \quad (10)$$

Because the expression of equation (10) includes $\hat{r}_2[1]$, user device 404 can use $r_1[3]$ to create a signal at a second virtual antenna, labeled 2, at time $t=1$, $r_2^v[1]$. This signal may be used to complement the true signal, $r_1[1]$, of user device 404. User device 404 received $r_1[2]$ earlier; thus, it can use it to eliminate $\hat{r}_1[2]$ from equation (10) to obtain the effective signal at virtual antenna 2, which is denoted $r_2^v[1]$ and given by $$r_2^v[1] = r_1[3] - H_{11}[3]r_1[2] \quad (11)$$
$$= H_{11}[3]\hat{r}_2[1] + z_1[3] - H_{11}[3]z_1[2]$$
$$= H_{11}[3]H_{21}[1]u_1[1] + H_{11}[3]H_{22}[1]u_2[1] + (z_1[3] - H_{11}[3]z_1[2])$$
$$= H_{21}^v[1]u_1[1] + H_{22}^v[1]u_2[1] + z_2^v[1]$$

where $$H_{2j}^V[1] = H_{11}[3]H_{2j}[1] \quad (12)$$

is the effective channel to virtual antenna 2, and $$z_2^V[1] = z_1[3] - H_{11}[3]z_1[2] \quad (13)$$

is the effective noise at virtual antenna 2. Essentially, $r_2^v[1]$ looks like a received signal at a virtual second antenna at user device 404 at time $t=1$. The processing described in equations (11)-(13) may be referred to as "VDR processing."

Similarly, the second user device 406 can utilize $u_1[3]$, because it contains $\hat{r}_1[2]$. At time $t=3$, user device 406 receives $$r_2[3] = H_{21}[3]u_1[3] + z_2[3] = H_{21}[3](\hat{r}_1[2] + \hat{r}_2[1]) + z_2[3] \quad (14).$$

The second user device 406 can then use $r_2[3]$ to estimate a signal at a second virtual antenna, labeled 1, at time $t=2$, to complement its true signal $r_2[2]$. User device 406 eliminates $\hat{r}_2[1]$ from $r_2[3]$ to obtain its own signal from virtual antenna 1 at time $t=2$, given by $$r_1^v[2] = r_2[3] - H_{21}[3]r_2[1] \quad (15)$$
$$= H_{11}^v[2]u_1[2] + H_{12}^v[2]u_2[2] + z_1^v[2]$$

where $$H_{1j}^V[2] = H_{21}[3]H_{1j}[2] \quad (16)$$

is the effective channel to virtual antenna 1, and $$z_1^V[2] = z_2[3] - H_{21}[3]z_2[1] \quad (17)$$

is the effective noise at virtual antenna 1.

Overall, the above-described scheme requires 3 channel uses to transmit 4 information symbols. The total rate is R=4/3 symbols per channel use. Because each user device feeds back information to the base station, the base station can exploit the multi-user nature of the scenario to efficiently pack information for more than one terminal in subsequent transmissions, e.g., composite symbols, and minimize the number of time periods. According to the above-described scheme, a VDR transmission cycle comprises of transmissions at $t=1$, 2, and 3. The VDR transmission cycle is repeated subsequently. For simplicity, we refer to the 3 phases in the cycle as $t=1$, 2 and 3. That is, the sequence of transmissions follows the pattern 1, 2, 3, 1, 2, 3 . . . .

According to particular embodiments of the present invention, a base station, such as base station 402, includes one or more antennas, one or more transceivers, and data processing resources, which together are configured to implement the pilot structure and VDR communication scheme detailed above. The pilot structure and VDR communication scheme described herein may also require certain actions and determinations by the user device 404.

In certain embodiments, a user device, for instance, user device 404, receives a first plurality of received symbols. These received symbols include a first set of data symbols and a first plurality of pilot sequences. For instance, the received symbols may include pilot sequences $p_1[1]$ and $p_1[2]$ shown in FIG. 6. They may be received from a base station, such as base station 402.

User device 404 then receives a second plurality of received symbols. These received symbols include a second set of data symbols and a second plurality of pilot sequences. For instance, the second plurality of information symbols may include pilot sequences $p_1[2]$ and $p_2[2]$ shown in FIG. 6. According to particular embodiments, the first plurality of information symbols was intended for the first user device 404, while the second plurality of information symbols was intended for a different terminal in the communication network, for instance, user device 406.

The user device 404 then determines a first channel estimate based, at least in part, on a first sequence of the second plurality of pilot sequences by correlating the second plurality of received symbols with the first pilot sequence. For instance, user device 404 may determine a first channel estimate, $H_{11}[2]$, according to $$H_{11}[2] = \sum_{k=1}^{N_p} (r_{1,k}[2] p_{1,k}^*[2]) \quad (18)$$

where $N_p$ is the number of received pilot symbols, $p^*_{1,k}[2]$ is the conjugate of the $k^{th}$ symbol of the first sequence of the second plurality of pilot sequences, and $r_{1,k}[2]$ is the $k^{th}$ symbol of the second plurality of received symbols.

Similarly, the user device 404 determines a second channel estimate based, at least in part, on a second sequence of the second plurality of pilot sequences by correlating the second plurality of received symbols with the second pilot sequence. For instance, user device 404 may determine a second channel estimate, $H_{12}[2]$, according to $$H_{12}[2] = \sum_{k=1}^{N_p} (r_{1,k}[2] p_{2,k}^*[2]) \quad (19)$$

where $N_p$ is the number of received pilot symbols, $p^*_{2,k}[2]$ is the conjugate of the le symbol of the second sequence of the second plurality of pilot sequences, and $r_{1,k}[2]$ is the $k^h$ symbol of the second plurality of received symbols.

After determining the channel estimates, the user device 404 transmits them. They may be transmitted directly to a base station, such as base station 402, or to an intermediary network location that is in communication with the base station. One or more composite symbols are then determined and transmitted to user device 404. The symbols may be determined, for example, in accordance with the process described with respect to the operation of base station 402.

Then, the user device 404 receives one or more composite symbols, which include one or more composite pilot sequences based on the first and second plurality of pilot sequences. The pilot sequence may be a combination of the first and second plurality of pilot sequences, for instance, as shown in equation (9).

The user device 404 may then implement the VDR scheme and determine an estimated effective signal value based on at least one of the composite symbols. This value may be determined, for instance, using equations (10)-(13) as discussed with respect to base station 402. This may include, for example, determining a third channel estimate based on the one or more composite symbols and forming a plurality of virtual antenna received symbols. The virtual antenna received symbols are based on the third channel estimate, the second plurality of received symbols, and the composite symbols. User device 404 is also able to demodulate the first set of data symbols using the first plurality of received symbols and the estimated effective signal value. The virtual antenna received symbols are estimated effective signal values.

According to particular embodiments, user equipment (UE), such as the device diagrammed in FIG. 5, includes one or more antennas 502, one or more transceivers 504, and data processing resources 506, which together are configured to improve data transmission in a communication network as detailed above.

According to certain embodiments, further constraints regarding orthogonality may be placed on the pilot sequences. For instance, it may be a requirement that the pilot sequences also be orthogonal across time; i.e., that $p_1[1]$ and $p_2[1]$ are orthogonal to $p_1[2]$ and $p_2[2]$. In this scenario, and given that user device 404 has already computed the estimates $\hat{H}_{11}[2]$ and $\hat{H}_{12}[2]$, it can now compute the estimate of the channel tap product $\overline{H_{11}[3]H_{11}[2]}$, which is given by $$\overline{H_{11}[3]H_{11}[2]} = \sum_{k=1}^{N_p} r_{1,k}[3] \rho_{1,k}^*[2] \quad (20)$$

Accordingly, there will not be any distortion from the other signal components (see equation 9), since all pilot sequences are orthogonal. Additionally, the product estimate (20) can be divided by $\hat{H}_{11}[2]$ to obtain an estimate $\hat{H}_{11}[3]$. Also, as with the result of equation (5) the product may be scaled by $\Sigma_{k=1}^{N_p} p_{j,k}[t] p_{j,k}^*[t]$.

Alternatively, user device 404 can compute the channel tap product estimate $\overline{H_{11}[3]H_{12}[2]}$ using pilot sequence $p_2[2]$, and divide it by $\hat{H}_{12}[2]$ to obtain another estimate of $H_{11}[3]$.

Also, in order to take advantage of the pilot energy to the largest extent, user device 404 can compute the estimate $\hat{H}_{11}[3]$ as an average:

$$\hat{H}_{11}[3] = \frac{\overline{H_{11}[3]H_{11}[2]} \cdot \hat{H}_{12}[2] + \overline{H_{11}[3]H_{12}[2]} \cdot \hat{H}_{11}[2]}{2 \cdot \hat{H}_{11}[2] \cdot \hat{H}_{12}[2]} \quad (21)$$

Any of the above-identified estimates enables user device 404 to complete the VDR transformation.

User device 406 may operate in a similar fashion. For example, at time t=3, it already has $\hat{H}_{21}[1]$ and $\hat{H}_{22}[1]$, and it can estimate $\overline{H_{11}[3]H_{21}[1]}$, $\overline{H_{11}[3]H_{22}[1]}$, or both, and get the corresponding estimate $\hat{H}_{11}[3]$.

According to certain embodiments of the present invention, user device 404 may determine virtual channel taps. For instance, given that user device 404 has the virtual antenna signal $r_2^V[1]$, for instance, as determined with respect to equation (10), it may estimate the virtual channel tap $H_{21}^V[1]$. This may be accomplished by computing the inner product with pilot sequence $p_1[1]$. Similarly, user device 404 may use pilot sequence $p_2[1]$ to estimate $H_{22}^V[1]$, which enables it to complete the VDR. Thus, user device 404 can demodulate the symbols $d_{j,k}[1]$ using 2-antenna receiver techniques such as minimum mean-square error (MMSE) or successive interference cancellation (SIC). User device 406 may operate in a similar way, first estimating the true channel tap $H_{21}[3]$, then the virtual taps $H_{11}^V[2]$ and $H_{12}^V[2]$.

According to particular embodiments, the requirement of orthogonality across time may be lifted. In this case, it may be necessary to introduce an additional sequence $p'_1[3]$, with $N_p$ symbols $p_{1,k}'[3]$, that can be placed in the same resource units as previously discussed pilot sequences. The additional sequence should be orthogonal to the other sequences, and equation (9) may be modified as follows:

$$p_{1,k}[3]=H_{11}[2]p_{1,k}[2]+H_{12}[2]p_{2,k}[2]+H_{21}[2]p_{1,k}[1]+H_{22}[2]p_{2,k}[1]+p_{1,k}'[3] \quad (22)$$

In this embodiment, the composite pilot sequence is a combination of five pilot sequences. A user device 404, 406 (terminal i) can compute the channel estimate according to $$\hat{H}_{i1}[3] = \sum_{k=1}^{N_p} r_{i,k}[3] p_{1,k}'^*[3] \quad (23)$$

Again, this value may be scaled, and enables the receiver to complete the VDR transformation.

In certain embodiments, the pilot sequences $p_1[1]$, $p_2[1]$, $p_1[2]$, $p_2[2]$, and $p'_1[3]$ can be based on Walsh-Hadamard sequences or Zadoff-Chu sequences. These sequences may all share the same set of radio resource elements (time, frequency) as illustrated in FIG. 6.

The VDR scheme described above can be generalized to involve more than two terminals and more than two transmit antennas. The pilot structure also generalizes accordingly.

Figure 10:
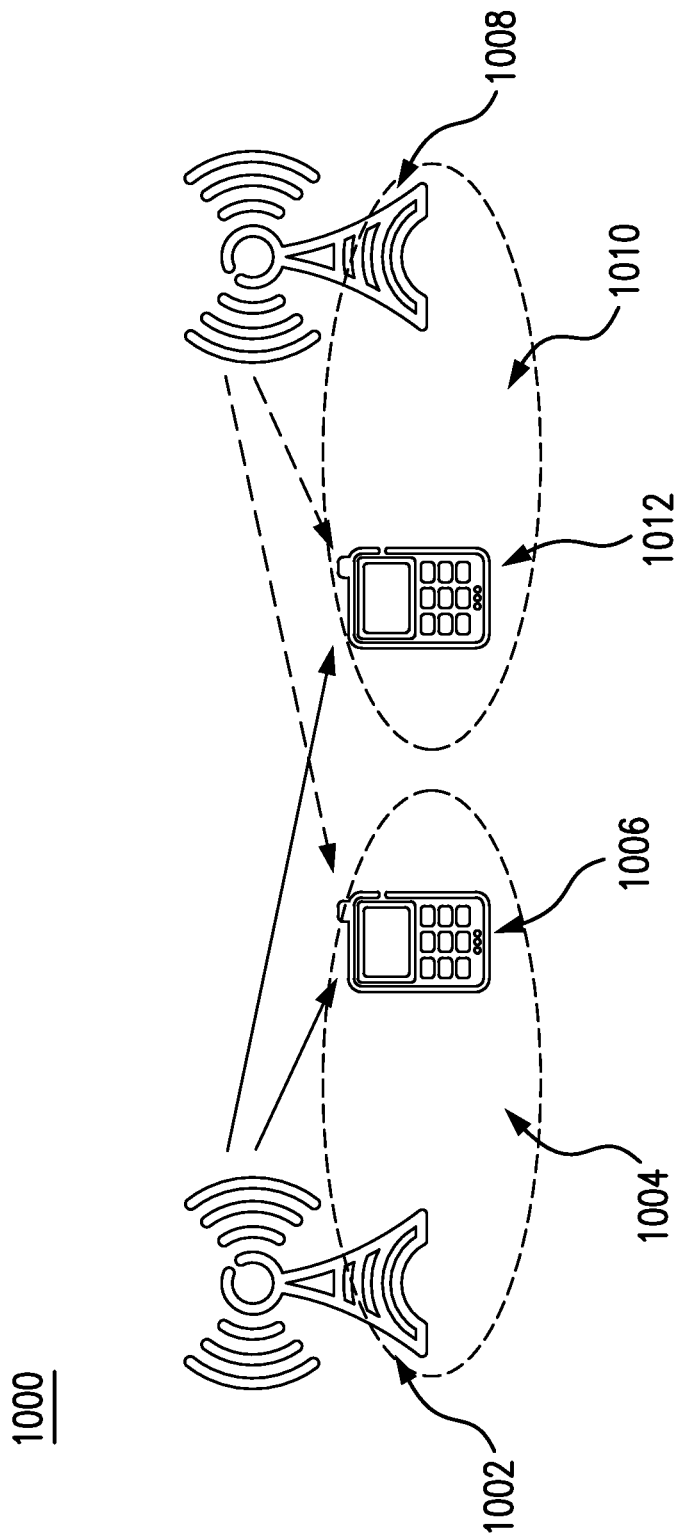
FIG. 10 is an illustration of a wireless communication system in accordance with exemplary embodiments of the present invention.

According to certain embodiments of the present invention, the disclosed VDR concept can be applied to a network including transmit antennas on different base stations and multiple user devices. For instance, the VDR concept may be adapted to a cell-edge scenario, as shown in FIG. 10. In this case, different user devices 1006, 1012 may belong to different base stations 1002, 1008, as shown by their respective cells 1004, 1010. Instead of signals from adjacent base stations fighting one another, they can be used constructively. For instance, at time t=1, base stations 1002 and 1008 may simultaneously transmit symbols $u_1[1]$ and $u_2[1]$ respectively, both intended for a first terminal, user device 1006. The second terminal, user device 1012, also listens. Similarly, at time t=2, base stations 1002 and 1008 simultaneously transmit symbols $u_1[2]$ and $u_2[2]$ intended for user device 1012, while user device 1006 listens.

In the scenario where each terminal communicates with its own serving base station, user device 1006 feeds back two channel values $H_{1j}[2]$ to its serving base station 1002 and user device 1012 feeds back two channel values $H_{2j}[1]$ to its serving base station 1008. It is presumed that the base stations 1002, 1008 can communicate directly or through the infrastructure. After the necessary exchange of information, a composite super-symbol is transmitted simultaneously from both base stations 1002, 1008 at time t=3.

The transmission of a common super symbol is possible due to the exchange of information between the base stations and terminals. For instance, at a minimum, base station 1002 knows $H_{11}[2]$, $H_{12}[2]$, $U_1[1]$ and $u_2[2]$, while base station 1008 knows $H_{21}[1]$, $H_{22}[1]$, $u_2[1]$ and $u_2[2]$. In order to synthesize a received value $\hat{r}_1[2]$ according to equation (6), it is necessary to have $H_{11}[2]$ $H_{12}[2]$, $u_1[2]$ and $u_2[2]$ known by a single device. Therefore, if base station 1008 (or a higher layer in the network) sends $u_2[2]$ to base station 1002, the latter can construct $\hat{r}_1[2]$.

Similarly, in order to synthesize $\hat{r}_2[1]$, it is necessary to have $H_{21}[1]$, $H_{22}[1]$, $u_1[1]$ and $u_2[1]$ known by a single device. If base station 1002 sends $u_1[1]$ to base station 1008, the latter can construct $\hat{r}_2[1]$. Finally, base station 1002 can send $\hat{r}_1[2]$ to base station 1008, and base station 1008 can send $\hat{r}_2[1]$ to base station 1002. At time t=3, both base stations transmit the same combined symbol, for instance, $$u_1[3]=u_2[3]=\hat{r}_1[2]+\hat{r}_2[1] \quad (24)$$

This transmission may be done in broadcast mode, so that the received signal appears to come from one base station.

Figure 11:
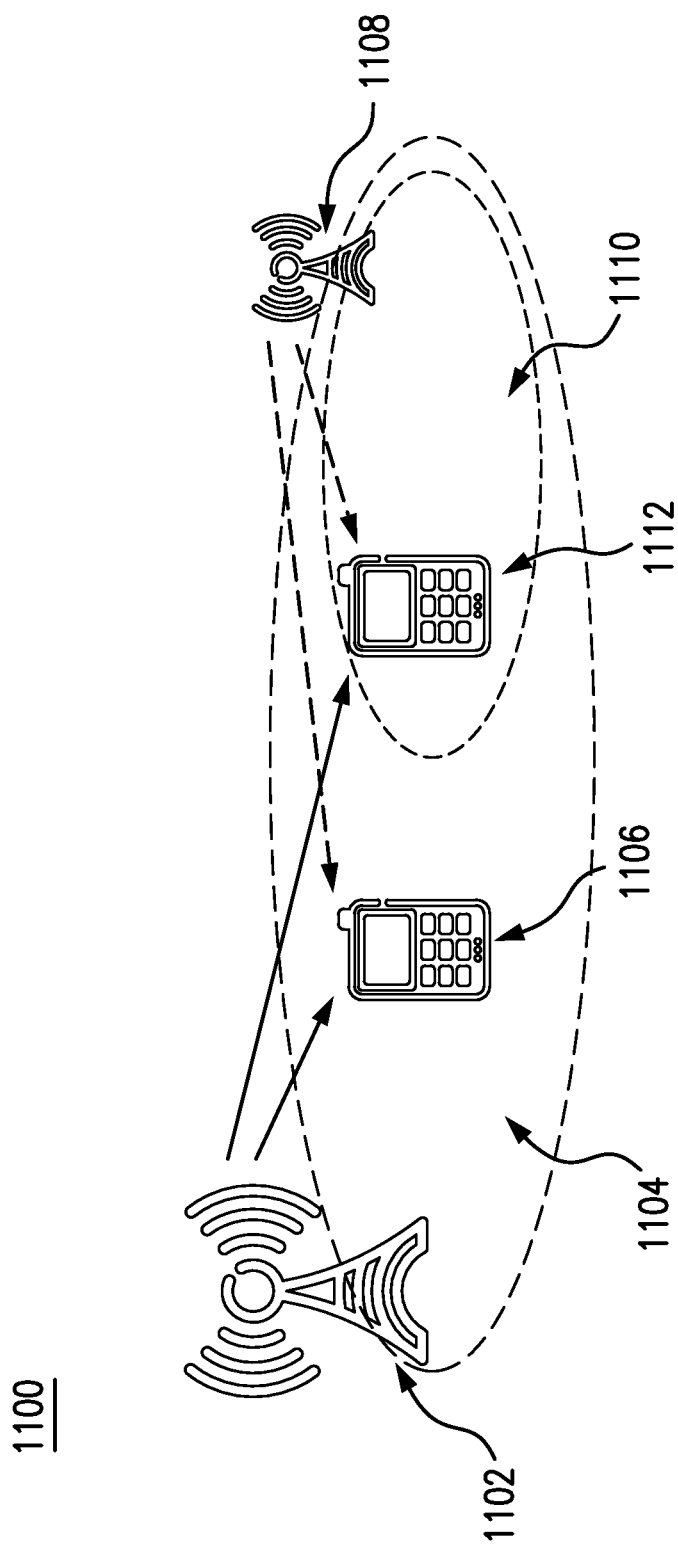
FIG. 11 is an illustration of a wireless communication system in accordance with exemplary embodiments of the present invention.

The pilot design described above readily applies to the two base station models illustrated in FIGS. 10 and 11. For t=1 and 2, base station i transmit pilot $p_i[t]$. For t=3, the network uses the channel feedback values received at both base stations to construct and transmit the pilot super-symbol according to equation (9) or (22).

According to certain embodiments, the above-described pilot structure and VDR scheme can be used to further improve performance in a communication network through the determination of one or more signal to interference plus noise ratios (SINRs). These SINRs may in turn be: (i) transmitted to a base station, such as base station 402, for subsequent processing and use in setting transmission rates; and/or (ii) used to determine one or more transmission rates at the use device, which are then transmitted to one or more base stations. These transmission rates may be used, for instance, to set the bit rates, in bits per symbol, for each of the streams $u_1[t]$ and $u_2[t]$.

Figure 7:
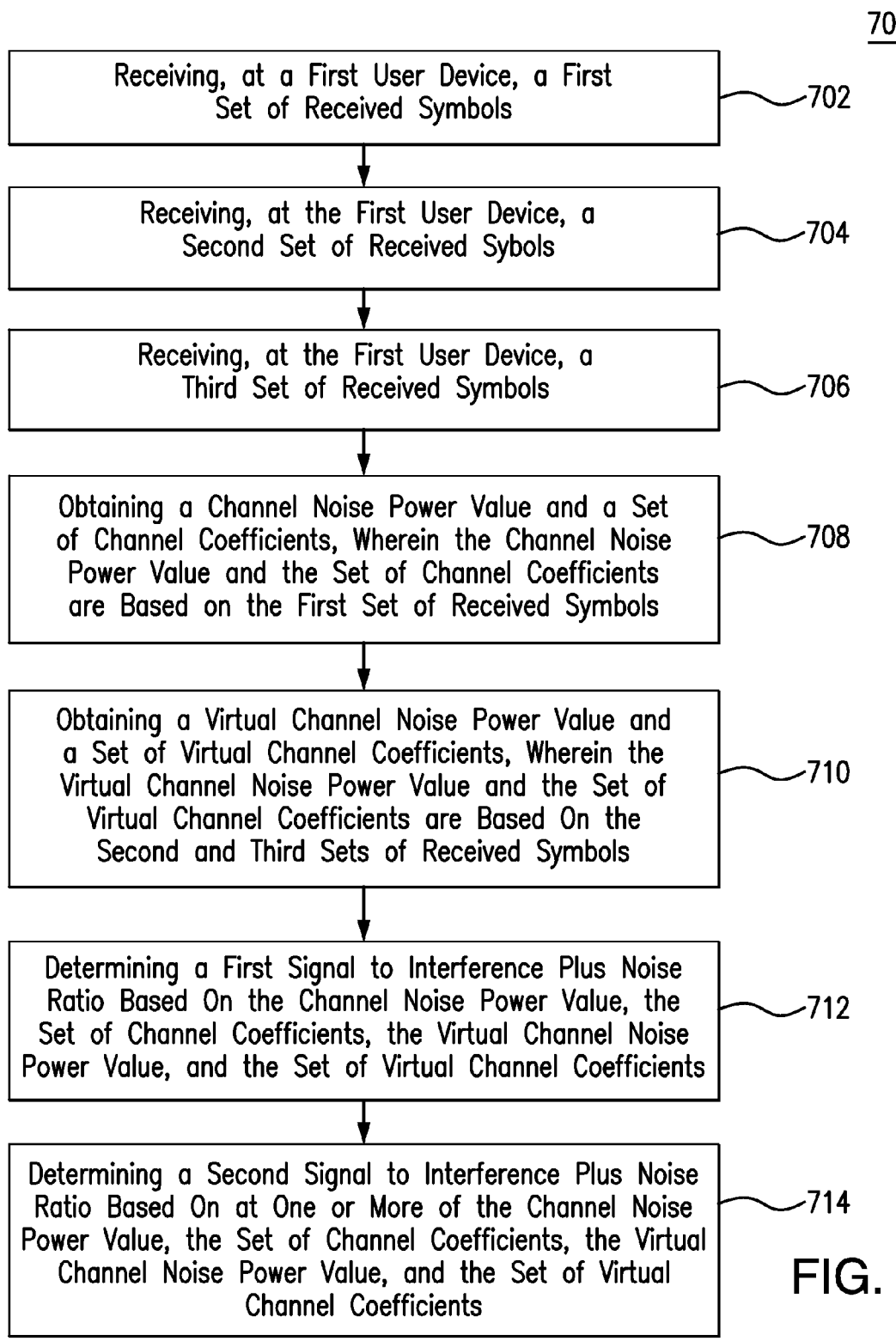
FIG. 7 is a flow chart illustrating a process for improving performance in a communication network in accordance with exemplary embodiments of the present invention.

Referring to FIG. 7, a flow chart 700 is shown, which illustrates a process for improving performance in a communication network that includes a plurality of transmit antennas and a plurality of user devices. According to particular embodiments, multiple transmit antennas may be co-located with a single base station, which is in communication with multiple user devices having only a single receive antenna. Alternatively, one or more of the transmit antennas may be co-located with different base stations, for instance, as shown if FIGS. 10 and 11. For example, as shown in FIG. 11, a first transmit antenna could be co-located with base station 1102 while a second antenna is co-located with a second base station 1108. In this example, the communication network is a heterogeneous network and the second base station 1108 is not a macrocell base station and is located within a cell 1104 of the first base station 1102. One of ordinary skill in the art will recognize that the following scenarios may be extended to the case of K transmit antennas and K user devices, for K>2. Similarly, the process 700 also applies to user devices that have more than one receive antenna.

In step 702, a user device 404 receives a first set of received symbols. The received symbols may include a first set of data symbols and a plurality of pilot sequences. For instance, the received symbols may include pilot sequence $p_1[1]$ and $p_1[2]$ shown in FIG. 6. They may be received from a base station, such as base station 402.

In step 704, the user device 404 receives a second set of received symbols. The second set of received symbols may include a second set of data symbols and a second plurality of pilot sequences. For instance, the second set of received symbols may include pilot sequences $p_1[2]$ and $p_2[2]$ shown in FIG. 6. According to particular embodiments, the first set of received symbols was intended for the user device 404, while the second set of received symbols was intended for a different terminal in the communication network, for instance, user device 406.

In step 706, the user device receives a third set of received symbols. According to particular embodiments, the third set of received symbols may be a set of composite symbols, which includes one or more composite pilot sequences based on the first and second plurality of pilot sequences. The composite pilot sequence may be a combination of the first and second plurality of pilot sequences, for instance, as shown in equation (9).

In order to determine one or more SINRs in the communication network, and thus, to set transmission rates, the user device must have knowledge of the average powers on the channels, the associated noise power values, the virtual channel power values, and the virtual noise power values.

In step 708, the user device obtains a channel noise power value and a set of channel coefficients based on the first set of received symbols. The channel coefficients may be estimated, for instance, based on pilot or reference symbols as described above in conjunction with equation (5). For example, channel coefficients $H_{11}[1]$ and $H_{12}[1]$ may be estimated by correlating the first received symbols with equation (5), wherein the received symbols are of the form:

$$r_{1,k}[1] = H_{11}[1]p_{1k}[1] + H_{12}[1]p_{2k}[1] + z_{1k}[1] \qquad (25).$$

This equation is similar to equation (1) discussed above, with the addition of a symbol index k and use of pilot symbol p rather than data symbol u. The noise power estimate may also be obtained based on equation (25) and the first received symbols according to:

$$P_{z_1[1]} = \frac{1}{N_p} \sum_{k=1}^{N_p} |r_{1,k}[1] - H_{11}[1]p_{1k}[1] - H_{12}[1]p_{2k}[1]|^2. \qquad (26)$$

According to certain embodiments, the above-identified channel estimates may be converted to power estimates, where:

$$P_{H_{11}[1]} = |H_{11}[1]|^2 \text{ and } P_{H_{12}[1]} = |H_{12}[1]|^2 \qquad (27).$$

Alternatively, the channel estimates may be converted to power estimates using time averaging as shown below:

$$P_{H_{ij}[t]} = \frac{1}{K} \sum_{k=0}^{K-1} |H_{ij}[t - D - k]|^2 \qquad (28)$$

where D is a delay, and K is the number of values. Similarly, the channel noise power value can be obtained according to:

$$P_{z_i[t]} = \frac{1}{K} \sum_{k=0}^{K-1} |z_i[t - D - k]|^2. \qquad (29)$$

In step 710, the user device obtains a virtual noise channel power value and a set of virtual channel coefficients. The virtual noise channel power value and the set of virtual channel coefficients are based on the second and third received symbols of steps 704 and 706. These virtual values may be determined, for instance, in accordance with the procedures outlined with respect to equations (1)-(17), which are based on the pilot structure described herein.

According to certain embodiments, the user device implements VDR processing to obtain a virtual receive signal, $r_2^V[1]$, which is given by $$r_2^V[1] = r_1[3] - H_{11}[3]r_1[2] \qquad (30)$$

Thus, the virtual receive signal is determined by the second received symbols, $r_1[2]$, and the third received symbols, $r_1[3]$, and the user device must know $H_{11}[3]$. $H_{11}[3]$ may be determined, for instance, based on equations (20) and (21) as described above. Once $r_2^V[1]$ is known, values for the virtual channel coefficients, $H_{21}^V[1]$ and $H_{22}^V[1]$, may be obtained by correlating $r_2^V[1]$ with the appropriate pilot sequences. For example, in a manner similar to that described with respect to equation (5), $r_2^V[1]$ may be related to the pilot symbols according to $$r_{2k}^v[1] = H_{21}^v[1]p_{1k}[1] + H_{22}^v[1]p_{2k}[1] + z_{2k}^v[1] \qquad (31).$$

Based on the foregoing, estimates for the virtual channel coefficients $H_{2j}^v[1]$, for j=1, 2, can be obtained according to $$H_{2j}^v = \frac{1}{N_p} \sum_{k=1}^{N_p} r_{2k}^v[1]p_{jk}^*[1] \qquad (32)$$

where $p^*_{j,k}[t]$ is the conjugate of a pilot signal, $p_{j,k}[t]$, received from a transmit antenna, j, at time t, and $N_p$ is a number of pilot signals.

Similarly, an estimate for the virtual channel noise power can be obtained according to $$P_{z_2^v[1]} = \frac{1}{N_p} \sum_{k=1}^{N_p} |r_{2k}^v[1] - H_{21}^v[1]p_{1k}[1] - H_{22}^v[1]p_{2k}[1]|^2. \qquad (33)$$

The virtual channel estimates can be converted to virtual power estimates according to equations (27) and/or (28). These power estimates may then be used in subsequent determinations of SINR.

In step 712, the user device determines a first SINR based on the channel noise power value, the set of channel coefficients, the virtual channel noise power value, and the set of virtual channel coefficients. This first SINR, $SINR_1[1]$, indicates the channel conditions for a first set of information symbols, $u_1[1]$, intended for a first user device at t=1. Similarly, a second SINR value, $SINR_2[1]$, is determined for the second set of information symbols, $u_2[1]$, intended for a first user device at t=1.

The signal to noise plus ratios can be used to determine rates for transmissions in a subsequent VDR cycle. Thus, according to certain embodiments, $SINR_1[1]$ and $SINR_2[1]$ can be used to determine the rate for transmissions of the first and second sets of information symbols, respectively, intended for a first user device in a subsequent VDR cycle.

According to certain embodiments, the first signal to interference plus noise ratio, $SINR_1[1]$, may be determined in accordance with "slow" rate control principles. For instance, $SINR_1[1]$ may be based on one or more actual channel power to noise ratios and one or more virtual channel power to noise ratios, utilizing one or more power adjustment factors associated with one or more of the transmit antennas. In certain embodiments, a MMSE receiver may be used, in which case $SINR_1[1]$ is determined by:

$$SINR_1[1] = \frac{P_1 P_{H_{11}[1]}}{P_2 P_{H_{12}[1]} + P_{z_1[1]}} + \frac{P_1 P_{H_{21}^v[1]}}{P_2 P_{H_{22}^v[1]} + P_{z_2^v[1]}} \qquad (34)$$

where $P_1$ is a power adjustment factors associated with a first transmit antenna and $P_2$ is a power adjustment factor associate with a second transmit antenna. $P_{H_{11}[1]}$ is an average power of a channel between the first user device and the first transmit antenna, $P_{H_{12}[1]}$ is an average power of a channel between the first user device and a second transmit antenna, and $P_{z_1[1]}$ is a channel noise power value. These values may be those obtained in step 708, for instance, in accordance with equations (25)-(29). $P_{z_2^v[1]}$ is the virtual channel noise power value obtained in step 710, and $P_{H_{21}^v[1]}$ and $P_{H_{22}^v[1]}$ are virtual channel power values based on the set of virtual channel coefficients obtained in step 710.

Applying similar principles, the SINR, $SINR_1[2]$, of a data stream intended for second user device, for instance UE 406, may be given as $$SINR_1[2] = \frac{P_1 P_{H_{11}[2]}}{P_2 P_{H_{12}[2]} + P_{z_1[2]}} + \frac{P_1 P_{H_{21}^v[2]}}{P_2 P_{H_{22}^v[2]} + P_{z_2^v[2]}} \quad (35)$$

when utilizing an MMSE receiver.

According to certain embodiments, the first signal to interference plus noise ratio, $SINR_1[k]$, for k=1, 2, may be determined in accordance with "fast" rate control principles. In these embodiments, $SINR_1[k]$ is determined by $$SINR_1[k] = P(H^v{}_1[k])^H (P_2 H_2^v[k](H_2^v[k])^H + R_{z[k]})^{-1} H_1^v[k] \quad (36)$$

when the device is using an MMSE receiver. $H_j^v[k]$ is the channel coefficient vector associated with a device k's virtual MIMO channel, and may be obtained, for instance, as described in step 710. According to certain aspects, $H_j^v[k]$ is defined as $$H_j^v[k] = [H_{1j}[k], H_{2j}^v[k]]^T \quad (37).$$

In equation (36), $R_{z[k]}$ is the noise covariance. According to certain aspects, the noise covariance may be defined by $$R_{z[k]} = \text{diag}(\sigma^2, \sigma^2 H_{k1}[3]) \quad (38)$$

where $\sigma^2$ is an expectation value of a noise parameter. According to particular embodiments, the noise covariance may be determined by $$R_{z[k]} = \text{diag}(P_{z_1[1]}, P_{z_2^v[1]}) \quad (39)$$

wherein $P_{z_1[1]}$ is a channel noise power value determined in accordance with step 708 and $P_{z_2^v[1]}$ is a virtual channel noise power value determined in accordance with step 710.

In step 714, the user device determines a second SINR based on one or more of the channel noise power value, the set of channel coefficients, the virtual channel noise power value, and the set of virtual channel coefficients. This second SINR, $SINR_2[1]$, indicates the channel conditions for a second data stream intended for a first user device.

According to certain embodiments, the second signal to interference plus noise ratio, $SINR_2[1]$ for the first user at t=1, may be determined in accordance with "slow" rate control principles. For instance, $SINR_2[1]$ may be determined by $$SINR_2[1] = \frac{P_2 P_{H_{12}[1]}}{P_1 P_{H_{11}[1]} + P_{z_1[1]}} + \frac{P_2 P_{H_{22}^v[1]}}{P_1 P_{H_{21}^v[1]} + P_{z_2^v[1]}} \quad (40)$$

when the first user device uses an MMSE receiver. In certain embodiments, it may be advantageous to use a SIC receiver, which cancels the interference from the first data stream before detecting the second data stream. In this case, the second SINR may be determined by $$SINR_2[1] = \frac{P_2 P_{H_{12}[1]}}{P_{z_1[1]}} + \frac{P_2 P_{H_{22}^v[1]}}{P_{z_2^v[1]}}. \quad (41)$$

Applying similar principles, the second SINR, $SINR_2[2]$, of a second data stream intended for second user device at t=2, for instance UE 406, may be given as $$SINR_2[2] = \frac{P_2 P_{H_{12}[2]}}{P_1 P_{H_{11}[2]} + P_{z_1[2]}} + \frac{P_2 P_{H_{22}^v[2]}}{P_1 P_{H_{21}^v[2]} + P_{z_2^v[2]}} \quad (42)$$

when the device uses an MMSE receiver, and $$SINR_2[2] = \frac{P_2 P_{H_{12}[2]}}{P_{z_1[2]}} + \frac{P_2 P_{H_{22}^v[2]}}{P_{z_2^v[2]}} \quad (43)$$

when the device uses a SIC receiver.

According to certain embodiments, the second signal to interference plus noise ratio, $SINR_2[k]$, for k=1,2, may be determined in accordance with "fast" rate control principles. For instance, $SINR_2[k]$ may be determined by $$SINR_2[k] = P_2(H_2^v[k])^H (P_1 H_1^v[k](H_1^v[k])^H + R_{z[k]})^{-1} H_2^v[k] \quad (44)$$

when the first user device uses an MMSE receiver. In certain embodiments, it may be advantageous to use a SIC receiver, in which case the second SINR may be determined by $$SINR_2[k] = P_2(H_2^v[k])^H (R_{z[k]})^{-1} H_2^v[k] \quad (45).$$

According to particular embodiments, user equipment (UE), such as the device diagrammed in FIG. 5, includes one or more antennas 502, one or more transceivers 504, and data processing resources 506, which together are configured to improve data transmission in a communication network as in flow chart 700.

Figure 9:
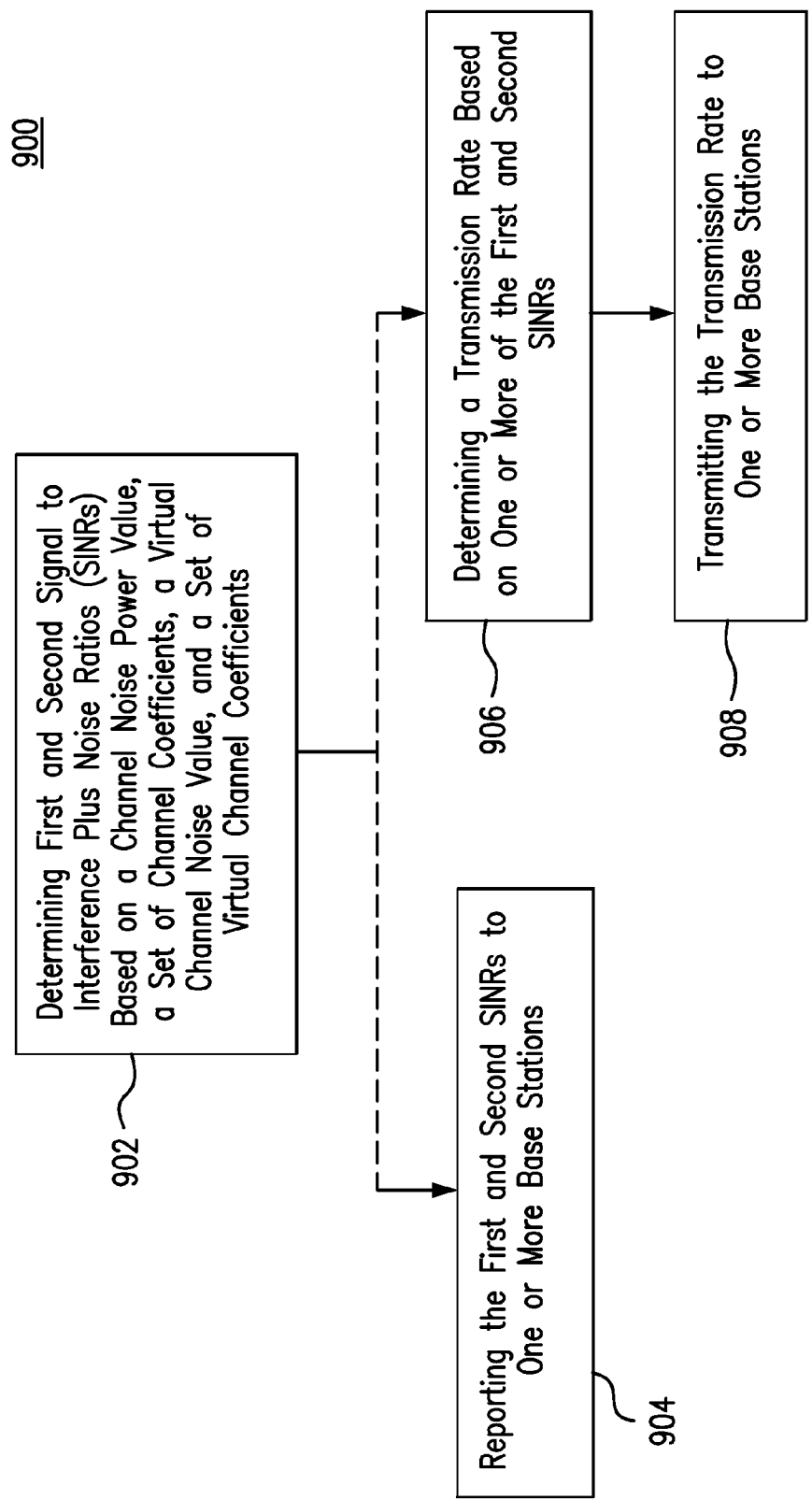
FIG. 9 is a flow chart illustrating a process for improving performance in a communication network in accordance with exemplary embodiments of the present invention.

As shown in FIG. 9, the SINR values may be used to determine transmission rates, either at the user device or at a base station. In step 902, a user device determines first and second signal to interference plus noise ratios based on a channel noise power value, a set of channel coefficients, a virtual channel noise power value, a the set of virtual channel coefficients describing a communications network. These values and coefficients may be obtained, for instance, as described above with respect to FIG. 7.

In step 904, the SINRs are reported to one or more base stations. The base stations can then use the reported values to determine appropriate transmission rates. Alternatively, or in addition to the reporting of step 904, in step 906, the user device may determine one or more transmission rates based on the SINRs. The transmission rate may be determined using a look-up table. For instance, the look-up table of FIG. 8 illustrates the correlation between SIRN values, modulation order, and coding rate. According to certain aspects of the embodiment, "transmission rate" may include both modulation and coding rates. However, transmission rates as disclosed herein are not limited to those shown in FIG. 8. In step 908, the determined transmission rate is transmitted to one or more base stations.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for improving performance in a communication network that includes a plurality of transmit antennas and one or more user devices, comprising:
   receiving, at a first user device, a first set of received symbols;
   receiving, at said first user device, a second set of received symbols;
   receiving, at said first user device, a third set of received symbols;
   obtaining a channel noise power value and a set of channel coefficients, wherein said channel noise power value and said set of channel coefficients are based on said first set of received symbols;
   obtaining a virtual channel noise power value and a set of virtual channel coefficients, wherein said virtual channel noise power value and said set of virtual channel coefficients are based on said second and third sets of received symbols;
   determining a first signal to interference plus noise ratio based on said channel noise power value, said set of channel coefficients, said virtual channel noise power value, and said set of virtual channel coefficients; and
   determining a second signal to interference plus noise ratio based on one or more of said channel noise power value, said set of channel coefficients, said virtual channel noise power value, and said set of virtual channel coefficients,
   wherein said channel noise power value, said set of channel coefficients, said virtual channel noise power value, and said set of virtual channel coefficients are each associated with a corresponding one of said plurality of transmit antennas.

2. The method of claim 1, further comprising:
   reporting said first and second signal to interference plus noise ratios to one or more base stations.

3. The method of claim 1, further comprising:
   determining a transmission rate based on one or more of said first and second signal to interference plus noise ratios; and
   transmitting said transmission rate to one or more base stations.

4. The method of claim 1, wherein said set of channel coefficients, $H_{i,j}[t]$, are determined such that:

$$\hat{H}_{ij}[t] = \sum_{k=1}^{N_p} r_{i,k}[t] p_{j,k}^*[t]$$

wherein $r_{i,k}[t]$ is a signal received by a terminal i, at time t, $p_{j,k}^*[t]$ is the conjugate of a pilot signal, $p_{j,k}[t]$, received from one of said plurality of transmit antennas, j, at time t, and $N_p$, is a number of pilot signals.

5. The method of claim 4, wherein said channel noise power value, $P_{z_1[1]}$, is determined such that:

$$P_{z_2^v[1]} = \frac{1}{N_p} \sum_{k=1}^{N_p} |r_{1k}^v[1] - H_{11}^v[1] p_{1k}[1] - H_{12}^v[1] p_{2k}[1]|^2.$$

6. The method of claim 1, wherein said first signal to interference plus noise ratio, $SINR_1$, is determined such that:

$$SINR_1[1] = \frac{P_1 P_{H_{11}[1]}}{P_2 P_{H_{12}[1]} + P_{z_1[1]}} + \frac{P_1 P_{H_{21}^v[1]}}{P_2 P_{H_{22}^v[1]} + P_{z_2^v[1]}}$$

where:
$P_1$ is a power adjustment factor associated with a first of said plurality of transmit antennas,
$P_2$ is a power adjustment factor associated with a second of said plurality of transmit antennas,
$P_{H_{11}[1]}$ is an average power of a channel between said first user device and said first transmit antenna,
$P_{H_{12}[1]}$ is an average power of a channel between said first user device and said second transmit antenna,
$P_{z_1[1]}$ is said channel noise power value,
$P_{z_2^v[1]}$ is said virtual channel noise power value, and
$P_{H_{21}^v[1]}$ and $P_{H_{12}^v[1]}$ are virtual channel power values based on said set of virtual channel coefficients.

7. The method of claim 6, wherein said first set of received symbols is received on a minimum mean-square error (MMSE) receiver of said first user device, and said second signal to interference plus noise ratio, $SINR_2$, is determined such that:

$$SINR_2[1] = \frac{P_2 P_{H_{12}[1]}}{P_1 P_{H_{11}[1]} + P_{z_1[1]}} + \frac{P_2 P_{H_{22}^v[1]}}{P_1 P_{H_{21}^v} + P_{z_2^v[1]}}.$$

8. The method of claim 6, wherein said first set of received symbols is received on a successive interference cancellation (SIC) receiver of said first user device, and said second signal to interference plus noise ratio, $SINR_2$, is determined such that:

$$SINR_2[1] = \frac{P_2 P_{H_{12}[1]}}{P_{z_1[1]}} + \frac{P_2 P_{H_{22}^v[1]}}{P_{z_2^v[1]}}.$$

9. The method of claim 1, wherein said first set of received symbols is received from a first of said plurality of transmit antennas and said second set of received symbols is received from a second of said plurality of transmit antennas.

10. The method of claim 9, wherein said first and second transmit antennas are co-located with a base station.

11. The method of claim 9, wherein said first transmit antenna is co-located with a first base station and said second transmit antenna is co-located with a second base station.

12. The method of claim 11, wherein said communication network is a heterogeneous network and said first base station is not a macrocell base station and is within a cell of said second base station.

13. The method of claim 6, wherein $P_{H_{11}[1]}$ is determined such that:

$$P_{H_{11}[1]} = |H_{11}[1]|^2$$

and $P_{H_{12}[1]}$ is determined such that
wherein said set of channel coefficients includes coefficients $H_{11}[1]$ and $H_{12}[1]$.

14. The method of claim 6, wherein $P_{H_{11}[1]}$ and $P_{H_{12}[1]}$ are determined such that:

$$P_{H_{ij}[t]} = \frac{1}{K}\sum_{k=0}^{K-1} |H_{ij}[t-D-k]|^2$$

over a number of values, k, where $H_{ij}[t]$ indicates one or more transmission properties between a user device, i, and a transmit antenna, j, and D is a delay.

15. The method of claim 6, wherein the noise power estimate $P_{z_1[1]}$ is determined such that:

$$P_{z_i[t]} = \frac{1}{K}\sum_{k=0}^{K-1} |z_i[t-D-k]|^2$$

over a number of values, k, where z is a noise value at a terminal, 1, and D is a delay.

16. The method of claim 1, wherein said first signal to interference plus noise ratio, $SINR_1$, is determined such that:

$$SINR_1[k] = P_1(H_1^v[k])^H (P_2 H_2^v[k](H_2^v[k])^H + R_{z[k]})^{-1} H_1^v[k]$$

where:
$P_1$ is a power adjustment factor associated with a first of said plurality of transmit antennas,
$P_2$ is a power adjustment factor associated with a second of said plurality of transmit antennas,
$R_{z[k]}$ is a noise covariance, and
the superscript H indicates the conjugate transpose,
wherein said set of virtual channel coefficients includes $H_1^v[k]$ and $H_2^v[k]$.

17. The method of claim 16, wherein said noise covariance, $R_{z[k]}$, is determined such that:

$$R_{z[k]} = \text{diag}(P_{z_1[1]}, P_{z_2^v[1]})$$

wherein $P_{z_1[1]}$ is said channel noise power value and $P_{z_2^v[1]}$ is said virtual channel noise power value.

18. The method of claim 16, wherein said second set of information symbols is received on a minimum mean-square error (MMSE) receiver of said first user device, and said second signal to interference plus noise ratio, $SINR_2$, is determined such that:

$$SINR_2[1] = P_2(H_2^v[1])^H (P_1 H_1^v[1](H_1^v[1])^H + R_{z[1]})^{-1} H_2^v[1].$$

19. The method of claim 16, wherein said second set of information symbols is received on a successive interference cancellation (SIC) receiver of said first user device, and said second signal to interference plus noise ratio, $SINR_2$, is determined such that:

$$SINR_2[1] = P_2(H_2^v[1])^H R_{z[1]}^{-1} H_2^v[1].$$

20. The method of claim 1, wherein said set of virtual channel coefficients is determined such that:

$$H_j^v[k] = [H_{1j}[k], H_{2j}^v[k]]^T$$

wherein $H_{ij}[k]$ represents a channel between a receive terminal, i, and a transmit antenna, j, for a given terminal, k, and $H_{ij}^v[k]$ represents a virtual channel between a virtual receive terminal, i, and a transmit antenna, j, for a given terminal, k.

21. The method of claim 1, wherein a portion of said set of virtual channel coefficients, $H_{2j}^v$, is determined such that:

$$H_{2j}^v = \frac{1}{N_p}\sum_{k=1}^{N_p} r_{2k}^v[1] p_{jk}^*[1]$$

wherein $r_{2,k}^v[t]$ is a signal received by a terminal i=2, at time t, $p_{j,k}^*[t]$ is the conjugate of a pilot signal, $p_{j,k}[t]$, received from a transmit antenna, j, at time t, and $N_p$ is a number of pilot signals.

22. The method of claim 21, wherein said virtual channel noise power value, $P_{z_2^v}[1]$, is determined such that:

$$P_{z_2^v[1]} = \frac{1}{N_p}\sum_{k=1}^{N_p} |r_{2k}^v[1] - H_{21}^v[1]p_{1k}[1] - H_{22}^v[1]p_{2k}[1]|^2.$$

23. A mobile device operable in a communication network to receive signals from a plurality of transmit antennas, comprising:
a processor;
a memory coupled to the processor;
a transceiver coupled to the processor; and
an antenna coupled to the transceiver configured to transmit and receive signals;
wherein the processor is configured to:
receive a first set of received symbols;
receive a second set of received symbols;
receive a third set of received symbols;
obtain a channel noise power value and a set of channel coefficients, wherein said channel noise power value and said set of channel coefficients are based on said first set of received symbols;
obtain a virtual channel noise power value and a set of virtual channel coefficients, wherein said virtual channel noise power value and said set of virtual channel coefficients are based on said second and third sets of received symbols;
determine a first signal to interference plus noise ratio based on said channel noise power value, said set of channel coefficients, said virtual channel noise power value, and said set of virtual channel coefficients; and
determine a second signal to interference plus noise ratio based on one or more of said channel noise power value, said set of channel coefficients, said virtual channel noise power value, and said set of virtual channel coefficients,
wherein said channel noise power value, said set of channel coefficients, said virtual channel noise power value, and said set of virtual channel coefficients are each associated with a corresponding one of said plurality of transmit antennas.

24. The device of claim 23, wherein said processor is further configured to;
report said first and second signal to interference plus noise ratios to one or more base stations.

25. The device of claim 23, wherein said processor is further configured to:
determine a transmission rate based on one or more of said first and second signal to interference plus noise ratios; and
transmit said transmission rate to one or more base stations.

26. The device of claim 23 wherein said set of channel coefficients, $H_{i,j}[t]$, are determined such that:

$$\hat{H}_{ij}[t] = \sum_{k=1}^{N_p} r_{i,k}[t] p_{j,k}^*[t]$$

wherein $r_{i,k}[t]$ is a signal received by a terminal i, at time t, $p^*_{j,k}[t]$ is the conjugate of a pilot signal, $p_{j,k}[t]$, received from one of said plurality of transmit antennas, j, at time t, and $N_p$ is a number of pilot signals.

27. The device of claim 26, wherein said channel noise power value, $P_{z_1}[1]$, is determined such that:

$$P_{z_2^v[1]} = \frac{1}{N_p}\sum_{k=1}^{N_p}|r_{2k}^v[1] - \hat{H}_{21}^v[1]p_{1k}[1] - \hat{H}_{22}^v[1]p_{2k}[1]|^2.$$

28. The device of claim 23, wherein said first signal to interference plus noise ratio, $SINR_1$, is determined such that:

$$SINR_1[1] = \frac{P_1 P_{H_{11}[1]}}{P_2 P_{H_{12}[1]} + P_{z_1[1]}} + \frac{P_1 P_{H_{21}^v[1]}}{P_2 P_{H_{22}^v} + P_{z_2^v[1]}}$$

where:
$P_1$ is a power adjustment factor associated with a first of said plurality of transmit antennas,
$P_2$ is a power adjustment factor associated with a second of said plurality of transmit antennas,
$P_{H_{11}[1]}$ is an average power of a channel between the device and said first transmit antenna,
$P_{H_{12}[1]}$ is an average power of a channel between the device and said second transmit antenna,
$P_{z_1[1]}$ is said channel noise power value,
$P_{z_2^v[1]}$ is said virtual channel noise power value, and
$P_{H_{21}^v[1]}$ and $P_{H_{22}^v[1]}$ are virtual channel power values based on said set of virtual channel coefficients.

29. The device of claim 28, wherein said transceiver is configured as a minimum mean-square error (MMSE) receiver and said second signal to interference plus noise ratio, $SINR_2$, is determined such that:

$$SINR_2[1] = \frac{P_2 P_{H_{12}[1]}}{P_1 P_{H_{11}[1]} + P_{z_1[1]}} + \frac{P_2 P_{H_{22}^v[1]}}{P_1 P_{H_{21}^v} + P_{z_2^v[1]}}.$$

30. The device of claim 28, wherein said transceiver is configured is a successive interference cancellation (SIC) receiver and said second signal to interference plus noise ratio, $SINR_2$, is determined such that:

$$SINR_2[1] = \frac{P_2 P_{H_{12}[1]}}{P_{z_1[1]}} + \frac{P_2 P_{H_{22}^v[1]}}{P_{z_2^v[1]}}.$$

31. The device of claim 23, wherein said first set of received symbols is received from a first of said plurality of transmit antennas and said second set of received symbols is received from a second of said plurality of transmit antennas.

32. The device of claim 31, wherein said first and second transmit antennas are co-located with a base station.

33. The device of claim 31, wherein said first transmit antenna is co-located with a first base station and said second transmit antenna is co-located with a second base station.

34. The device of claim 33, wherein said communication network is a heterogeneous network and said first base station is not a macrocell base station and is within a cell of said second base station.

35. The device of claim 28, wherein $P_{H_{11}[1]}$ determined such that:

$$P_{H_{11}[1]} = |H_{11}[1]|^2$$

and $P_{H_{12}[1]}$ is determined such that:

$$P_{H_{12}[1]} = |H_{12}[1]|^2$$

wherein said set of channel coefficients includes coefficients $H_{11}[1]$ and $H_{12}[1]$.

36. The device of claim 28, wherein $P_{H_{11}[1]}$ and $P_{H_{12}[1]}$ are determined such that:

$$P_{H_{ij}[1]} = \frac{1}{K}\sum_{k=0}^{K-1}|H_{ij}[t-D-k]|^2$$

over a number of values, k, where $H_{ij}[t]$ indicates one or more transmission properties between a user device, i, and a transmit antenna, j, and D is a delay.

37. The device of claim 28, wherein the noise power estimate $P_{z_1[1]}$ is determined such that:

$$P_{z_i[t]} = \frac{1}{K}\sum_{k=0}^{K-1}|z_i[t-D-k]|^2$$

over a number of values, k, where $z_i$ is a noise value at a terminal, i, and D is a delay.

38. The device of claim 23, wherein said first signal to interference plus noise ratio, $SINR_1$, is determined such that:

$$SINR_1[k] = P_1(H_1^v[k])^H(P_2H_2^v[k](H_2^v[k])^H + R_{z[k]})^{-1}H_1^v[k]$$

where:
$P_1$ is a power adjustment factor associated with a first of said plurality of transmit antennas,
$P_2$ is a power adjustment factor associated with a second of said plurality of transmit antennas,
$R_{z[k]}$ is a noise covariance, and
the superscript H indicates the conjugate transpose,
wherein said set of virtual channel coefficients includes $H_1^v[k]$ and $H_2^v[k]$.

39. The device of claim 38, wherein said noise covariance, $R_{z[k]}$, is determined such that:

$$R_{z[k]} = \text{diag}(P_{z_1[1]}, P_{z_2^v[1]})$$

Wherein $P_{z_1[1]}$ is said channel noise power value and $P_{z_2^v[1]}$ is said virtual channel noise power value.

40. The device of claim 38, wherein said transceiver is configured as a minimum mean-square error (MMSE) receiver and said second signal to interference plus noise ratio, $SINR_2$, is determined such that:

$$SINR_2[1] = P_2(H_2^v[1])^H(P_1H_1^v[1](H_1^v[1])^H + R_{z[1]})^{-1}H_2^v[1].$$

41. The device of claim 38, wherein said transceiver is configured as a successive interference cancellation (SIC) receiver and said second signal to interference plus noise ratio, $SINR_2$, is determined such that:

$$SINR_2[1] = P_2(H_2^v[1])^H R_{z[1]}^{-1} H_2^v[1].$$

42. The device of claim 23, wherein said set of virtual channel coefficients is determined such that:

$$H_j^v[k]=[H_{1j}^v[k],H_{2j}^v[k]]^T$$

wherein $H_{ij}[k]$ represents a channel between a receive terminal, i, and a transmit antenna, j, for a given terminal, k, and $H^v_{ij}[k]$ represents a virtual channel between a virtual receive terminal, i, and a transmit antenna, j, for a given terminal, k.

43. The device of claim 23, wherein a portion of said set of virtual channel coefficients, $H^v_{2j}$, is determined such that:

$$H_{2j}^v = \frac{1}{N_p}\sum_{k=1}^{N_p} r_{2k}^v[1]p_{jk}^*[1]$$

wherein $r^v_{2,k}[t]$ is a signal received by a terminal i=2, at time t, $p^*_{j,k}[t]$ is the conjugate of a pilot signal, $p_{j,k}[t]$, received from a transmit antenna, j, at time t, and $N_p$ is a number of pilot signals.

44. The device of claim 43, wherein said virtual channel noise power value, $P_{z_2^v[1]}$, is determined such that:

$$P_{z_2^v[1]} = \frac{1}{N_p}\sum_{k=1}^{N_p} |r_{2k}^v[1] - H_{21}^v[1]p_{1k}[1] - H_{22}^v[1]p_{2k}[1]|^2.$$

* * * * *

UNITED STATES PATENT AND TRADEMARK OFFICE
CERTIFICATE OF CORRECTION

PATENT NO. : 8,848,773 B2  
APPLICATION NO. : 13/633733  
DATED : September 30, 2014  
INVENTOR(S) : Khayrallah et al.

Page 1 of 4

It is certified that error appears in the above-identified patent and that said Letters Patent is hereby corrected as shown below:

On the Title Page, in the Figure, for Tag "704", in Line 2, delete "Sybols" and insert -- symbols --, therefor.

In the Drawings

In Fig. 7, Sheet 7 of 11, for Tag "704", in Line 2, delete "sybols" and insert -- symbols --, therefor.

In the Specification

In Column 3, Lines 42-43, delete

"$$SINR_1 = \frac{P_1 P_{H_{11}[t]}}{P_2 P_{H_{12}[t]} + P_{z-1}[t]} + \frac{P_1 P_{H_{21}[t]}}{P_2 P_{H_{22}[t]} + P_{z2}[t]} \qquad \text{(viii)}$$", and insert --

$$SINR_1 = \frac{P_1 P_{H_{11}[t]}}{P_2 P_{H_{12}[t]} + P_{z_1}[t]} + \frac{P_1 P_{H_{21}[t]}}{P_2 P_{H_{22}[t]} + P_{z_2}[t]} \qquad \text{(viii)}$$

--, therefor.

In Column 6, Line 55, delete "device 504" and insert -- device 404 --, therefor.

In Column 7, Line 48, delete "u₁[t]" and insert -- $u_i[t]$ --, therefor.

In Column 7, Line 50, delete "r₁[t]" and insert -- $r_i[t]$ --, therefor.

In Column 7, Line 51, delete "z₁[t]" and insert -- $z_i[t]$ --, therefor.

Signed and Sealed this  
First Day of December, 2015

*Michelle K. Lee*  
Michelle K. Lee  
*Director of the United States Patent and Trademark Office*

CERTIFICATE OF CORRECTION (continued)
U.S. Pat. No. 8,848,773 B2

In Column 7, Line 65, delete "$u_1[t]$" and insert -- $u_i[t]$ --, therefor.

In Column 8, Line 3, delete "$u_1[t]$" and insert -- $u_i[t]$ --, therefor.

In Column 8, Line 6, delete "$u_1[t]$" and insert -- $u_i[t]$ --, therefor.

In Column 8, Line 7, delete "$d_1[t]$," and insert -- $d_i[t]$, --, therefor.

In Column 8, Line 8, delete "$p_1[t]$. A set of pilot symbols $p_1[t]$" and insert -- $p_i[t]$. A set of pilot symbols $p_i[t]$ --, therefor.

In Column 8, Line 9, delete "$u_1[t]$, e.g., the first $N_p$ resource units of $u_1[t]$." and insert -- $u_i[t]$, e.g., the first $N_p$ resource units of $u_i[t]$. --, therefor.

In Column 8, Line 10, delete "$d_1[t]$" and insert -- $d_i[t]$ --, therefor.

In Column 8, Line 11, delete "$u_1[t]$." and insert -- $u_i[t]$. --, therefor.

In Column 8, Line 40, delete "$r_1[t]$" and insert -- $r_i[t]$ --, therefor.

In Column 11, Line 48, delete "le" and insert -- $k^{th}$ --, therefor.

In Column 11, Line 49, delete "$k^h$" and insert -- $k^{th}$ --, therefor.

In Column 13, Lines 12-13, delete
"$p_{1,k}[3] = H_{11}[2]p_{1,k}[2] + H_{12}[2]p_{2,k}[2] + H_{21}[2]p_{1,k}[1] + H_{22}[2]p_{2,k}[1] + p_{1,k}'[3]$" and insert -- $p_{1,k}[3] = H_{11}[2]p_{1,k}[2] + H_{12}[2]p_{2,k}[2] + H_{21}[2]p_{1,k}[1] + H_{22}[2]p_{2,k}[1] + p_{1,k}'[3]$ --, therefor.

In Column 13, Line 64, delete "$H_{11}[2]$" and insert -- $H_{11}[2]$, --, therefor.

In Column 15, Line 21, delete
"$r_{1,k}[1] = H_{11}[1]p_{1k}[1] + H_{12}[1]p_{2k}[1] + z_{1k}[1]$" and insert -- $r_{1k}[1] = H_{11}[1]p_{1k}[1] + H_{12}[1]p_{2k}[1] + z_{1k}[1]$ --, therefor.

In Column 17, Line 9, delete "$P_Z{}^Y{}_{2[1]}$" and insert -- $P_Z{}^Y{}_{2[1]}$ --, therefor.

CERTIFICATE OF CORRECTION (continued)
U.S. Pat. No. 8,848,773 B2

In Column 17, Lines 28-29, delete "$SINR_1[k]=P(H^v_1[k])^H(P_2H_2^v[k](H_2^v[k])^H+R_{z[k]})^{-1}H_1^v[k]$" and insert -- $SINR_1[k] = P_1\left(\mathbf{H}_1^v[k]\right)^H \left(P_2\mathbf{H}_2^v[k]\left(\mathbf{H}_2^v[k]\right)^H + \mathbf{R}_{z[k]}\right)^{-1} \mathbf{H}_1^v[k]$ --, therefor.

In Column 17, Line 37, delete "$R_{Z[i]}$" and insert -- $R_{Z[k]}$ --, therefor.

In Column 18, Line 59, delete "SIRN" and insert -- SINR --, therefor.

In the Claims

In Column 20, Line 2, in Claim 4, delete "$N_P$," and insert -- $N_P$ --, therefor.

In Column 20, Line 8, in Claim 5, delete

"$P_{Z_2^U}[1] = \frac{1}{N_p} \sum_{k=1}^{N_p} |r_{1k}^v[1] - H_{11}^v[1]p_{1k}[1] - H_{12}^v[1]p_{2k}[1]|^2.$" and insert -- $P_{Z_2^v[1]} = \frac{1}{N_p}\sum_{k=1}^{N_p}|r_{1k}^v[1] - H_{11}^v[1]p_{1k}[1] - H_{12}^v[1]p_{2k}[1]|^2$ --, therefor.

In Column 20, Line 31, in Claim 6, delete "$P_{H12}{}^V{}_{[1]}$" and insert -- $P_{H22}{}^V{}_{[1]}$ --, therefor.

In Column 21, Line 6, in Claim 13, after "such that"

insert -- $P_{H_{12}[1]} = |H_{12}[1]|^2$ --.

In Column 21, Line 8, in Claim 13, delete "$H_{11[}1]$ and $H_{12[}1]$." and insert -- H11[1] and H12[1]. --, therefor.

In Column 21, Line 27, in Claim 15, delete "z" and insert -- $z_i$ --, therefor.

In Column 21, Line 28, in Claim 15, delete "1," and insert -- i, --, therefor.

In Column 21, Line 40, in Claim 16, delete "$R_{z[k]}$ is a noise covariance, and" and insert -- $R_{z[k]}$ is a noise covariance, and --, therefor.

In Column 22, Line 59, in Claim 24, delete "to;" and insert -- to: --, therefor.

CERTIFICATE OF CORRECTION (continued)
U.S. Pat. No. 8,848,773 B2

In Column 24, Line 22, in Claim 36, delete " $P_{H_{ij}}[1] = \frac{1}{K}\sum_{k=0}^{K-1}|H_{ij}[t-D-k]|^2$ "

and insert -- $P_{H_{ij}}[t] = \frac{1}{K}\sum_{k=0}^{K-1}|H_{ij}[t-D-k]|^2$ --, therefor.

In Column 24, Line 40, in Claim 38, delete " $SINR_1[k] = P_1(H_1^v[k])^H(P_2H_2^v[k](H_2^v[k])^H + R_{z[k]})^{-1} H_1^v[k]$ " and insert -- $SINR_1[k] = P_1(\mathbf{H}_1^v[k])^H (P_2\mathbf{H}_2^v[k](\mathbf{H}_2^v[k])^H + \mathbf{R}_{z[k]})^{-1} \mathbf{H}_1^v[k]$ --, therefor.

In Column 24, Line 61, in Claim 40, delete " $SINR_2[1] = P_2(H^v_2[1])^H(P_1H^v_1[1](H^v_1[1])^H + R_{z[1]})^{-1} H^v_2[1].$ " and insert -- $SINR_2[1] = P_2(\mathbf{H}^v_2[1])^H (P_1\mathbf{H}^v_1[1](\mathbf{H}^v_1[1])^H + \mathbf{R}_{z[1]})^{-1} \mathbf{H}^v_2[1].$ --, therefor.

In Column 25, Line 4, in Claim 42, delete " $H_j^v[k] = [H_{1j}^v[k], H_{2j}^v[k]]^T$ " and insert -- $\mathbf{H}_j^v[k] = [H_{1j}^v[k], H_{2j}^v[k]]^T$ --, therefor.